(12) United States Patent
Dua

(10) Patent No.: US 9,232,258 B2
(45) Date of Patent: *Jan. 5, 2016

(54) APPARATUS, SYSTEM, AND METHOD TO EXTEND CONNECTIVITY IN MULTIMEDIA PRESENTATION DEVICE

(71) Applicant: Robin Dua, San Francisco, CA (US)

(72) Inventor: Robin Dua, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/469,884

(22) Filed: Aug. 27, 2014

(65) Prior Publication Data

US 2014/0373055 A1    Dec. 18, 2014

Related U.S. Application Data

(63) Continuation of application No. 11/689,365, filed on Mar. 21, 2007, now Pat. No. 8,887,212.

(60) Provisional application No. 60/783,825, filed on Mar. 21, 2006.

(51) Int. Cl.
*H04N 7/18* (2006.01)
*H04N 7/16* (2011.01)
(Continued)

(52) U.S. Cl.
CPC .......... *H04N 21/42221* (2013.01); *G06F 13/10* (2013.01); *G06F 13/4221* (2013.01); *G06Q 20/14* (2013.01); *H04L 63/0471* (2013.01); *H04L 65/60* (2013.01); *H04N 7/163* (2013.01); *H04N 21/2347* (2013.01); *H04N 21/2543* (2013.01); *H04N 21/4181* (2013.01); *H04N 21/4183* (2013.01); *H04N 21/42206* (2013.01); *H04N 21/42607* (2013.01); *H04N 21/4363* (2013.01); *H04N 21/43635* (2013.01); *H04N 21/43637* (2013.01); *H04N 21/441* (2013.01);

(Continued)

(58) Field of Classification Search
CPC .......... H04N 21/42221; H04N 21/441; H04N 21/42607; H04N 21/64322; H04N 21/2543; H04N 21/4363; H04N 21/4402; H04N 21/42206; H04N 21/47217; H04N 21/440218; H04N 21/4405; H04N 21/2347; H04N 21/43637; H04N 7/163; H04N 21/4183; H04N 21/4181; G06Q 20/14; G06Q 13/4221; G06Q 13/10; H04L 65/60; H04L 63/0471; H04W 8/08; H04W 12/06; H04W 48/16; H04W 4/00
USPC .............. 725/81, 31, 62, 115, 117, 145, 147; 380/201, 270; 455/41.1, 41.2, 41.3, 455/3.06; 709/219, 227, 231; 726/18, 19; 705/57

See application file for complete search history.

(56) References Cited

U.S. PATENT DOCUMENTS

2006/0073845 A1 *  4/2006  Lin ........................... 455/550.1

*Primary Examiner* — Hoang-Vu A Nguyen-Ba
(74) *Attorney, Agent, or Firm* — Stanzione & Associates, PLLC

(57) ABSTRACT

An extended connectivity apparatus provides multimedia data from a multimedia source device to a multimedia presentation device. An electrical connector mechanically couples to a connector of the multimedia presentation device to provide a communication path to the multimedia presentation device. A wireless communication interface, which is selectively separable from the multimedia presentation device at the electrical connector, receives multimedia data over a wireless communication channel. A processor, which is also selectively separable from the multimedia presentation device at the electrical connector, encodes the received multimedia data into a format compatible with presentation capabilities of the multimedia presentation device and conveys the encoded multimedia data to the multimedia presentation device through the electrical connector.

54 Claims, 9 Drawing Sheets

(51) Int. Cl.

| | |
|---|---|
| *H04N 21/422* | (2011.01) |
| *H04W 48/16* | (2009.01) |
| *H04N 21/4363* | (2011.01) |
| *H04L 29/06* | (2006.01) |
| *H04N 21/2347* | (2011.01) |
| *H04N 21/4405* | (2011.01) |
| *H04W 12/06* | (2009.01) |
| *H04W 4/00* | (2009.01) |
| *H04N 21/418* | (2011.01) |
| *H04N 21/4402* | (2011.01) |
| *H04N 21/472* | (2011.01) |
| *H04W 8/08* | (2009.01) |
| *G06F 13/10* | (2006.01) |
| *G06F 13/42* | (2006.01) |
| *G06Q 20/14* | (2012.01) |
| *H04N 21/2543* | (2011.01) |
| *H04N 21/426* | (2011.01) |
| *H04N 21/441* | (2011.01) |
| *H04N 21/643* | (2011.01) |
| *H04N 7/167* | (2011.01) |
| *H04N 7/173* | (2011.01) |
| *H04K 1/00* | (2006.01) |
| *H04B 5/00* | (2006.01) |
| *H04B 7/00* | (2006.01) |
| *H04H 40/00* | (2009.01) |
| *G06F 15/16* | (2006.01) |
| *G06F 7/04* | (2006.01) |
| *G06F 21/00* | (2013.01) |

(52) U.S. Cl.
CPC ....... *H04N 21/4402* (2013.01); *H04N 21/4405* (2013.01); *H04N 21/440218* (2013.01); *H04N 21/47217* (2013.01); *H04N 21/64322* (2013.01); *H04W 4/00* (2013.01); *H04W 8/08* (2013.01); *H04W 12/06* (2013.01); *H04W 48/16* (2013.01); *H04L 2209/805* (2013.01)

APPARATUS, SYSTEM, AND METHOD TO EXTEND CONNECTIVITY IN MULTIMEDIA PRESENTATION DEVICE

CROSS-REFERENCE TO RELATED APPLICATIONS

This application is a continuation application claiming benefit of U.S. patent application Ser. No. 11/689,365, now issued as U.S. Pat. No. 8,887,212, filed with United States Patent and Trademark Office on Mar. 21, 2007, which claims the benefit of U.S. Provisional Application No. 60/783,825 filed with United States Patent and Trademark Office on Mar. 21, 2006. The disclosures of the foregoing patent applications are incorporated herein in their respective entireties by reference.

BACKGROUND OF THE INVENTION

1. Field of the Invention

The present general inventive concept relates to a point of deployment (POD) module and a method thereof. More specifically, the present general inventive concept relates to a wireless point of deployment (POD) module and a method thereof.

2. Description of the Related Art

Broadband communication systems, such as satellite and cable television systems, are now capable of providing many services in addition to broadcast video. In implementing enhanced programming, the set-top terminal (STT), otherwise known as a set-top box, has become an important computing device for accessing various video services. In addition to supporting traditional broadcast video functionality, many STTs now also provide other functionality, such as, an Interactive Program Guide (IPG), video-on-demand (VOD), subscription video-on-demand (SVOD), and functionality traditionally associated with a conventional computer, such as web browsing, e-mail, and instant messaging. Some newer STTs also have the ability to record an incoming video stream in digitized form onto a storage device such as a hard disk drive, and playback that recorded video as desired by the user. This functionality has become known as a digital video recorder (DVR) or personal video recorder (PVR) and is viewed as a superior alternative to conventional video tape recorders for capture and subsequent playback of programming content.

Furthermore, digital televisions that are capable of receiving signals directly from the communications systems are now available in the market. In this case, the television does not necessarily require the STT. Typically, the signals are encrypted prior to sending them through the communications systems, so a point of deployment (POD) module is required in order for the television to display the encrypted signals. Cable Television Laboratories, Inc. (CableLabs®), a research and development consortium, has defined specifications for a POD module (CableCARD) for use with a host device such as a television or STT.

A CableCARD is a PCMCIA Type II form factor device, which plugs into the conditional access (CA) slot on a host device and decrypts input signals received via cable. Cable providers distribute these modules to better ensure that the owners of the host devices have paid for the services and programs being accessed.

The CableCARD will selectively descramble the content only if the customer is authorized. CableCARDs are designed to descramble scrambled content into a clear format for viewing and/or listening, and may impose constraints and conditions on the recording and playback when the content is copy-protected through re-scrambling as it flows back to the host device.

The POD module may be one-way (i.e., decrypts incoming signals only) or two-way (i.e., decrypts incoming signals and transmits signals to the headend). A two-way CableCARD is also referred to as an advanced multi-stream CableCARD or AMS CableCARD.

The use of POD modules, such as CableCARD, is not limited to use with cable systems. In Europe, for example, POD devices called "Common Interface Modules" are used in the satellite industry. These modules are also PCMCIA Type II form factor based devices. The invention described herein applies equally to all types of POD modules, including, but not limited to CableCARDs and Common Interface Modules.

While POD modules obviate the need for STTs that perform the same functions described above, the current generation of POD modules has several limitations, which have impeded their widespread use. For example, the current generation of CableCARDs deployed in the United States are one-way and do not provide for an Interactive Program Guide, Video on Demand control functions, interactive and enhanced services, pay-per-view, and other capabilities. While two-way CableCARDs have been developed and should provide some of these features in the future, there exists a backward compatibility problem with existing host devices that only support one-way CableCARD modules. Accordingly, there is a need in the art for a two-way POD module that can work with an older generation of hosts that only support one-way communication.

Even with the newer CableCARDs that support two-way communication, consumers are still faced with having to purchase multiple media devices in order to satisfy their entertainment needs. These media devices include, for example, digital video recorders (e.g., TiVo™ and ReplayTV™ terminals), network entertainment systems (e.g., Microsoft Media Center-based devices), datacast receivers (e.g., MovieBeam™), Internet-based set-top terminals (e.g., MSN TV and Apple TV), and gaming terminals (e.g., Microsoft® Xbox 360). These devices tend to be expensive and take valuable real estate within the home. With an ever-increasing number of media devices available in the market, there is a need in the art for a POD module that can perform the same functions as many of these media devices as possible, thereby eliminating their need. This benefit is also important in context of the increasing availability and demand for liquid crystal display (LCD) televisions, plasma televisions, and other types of display devices that can be mounted on a wall. Consumers that acquire these types of display devices would generally prefer to eliminate visible set-top boxes and cabling for simplification and esthetic reasons.

In a separate trend, an increasing processing speed and a reduced size of electronic components has contributed to a proliferation of personal computers capable of handling digital media. The explosive growth of the Internet and the World Wide Web have resulted in a correlative increase in the downloading and sharing of audio-visual files, including videos, music, and photos. As powerful personal computers become a repository for digital content and offer functionality such as Internet file sharing, digital recording, content editing, multimedia time-shifting, network gaming, and other capabilities—it is increasingly desirable to provide a seamless interconnection between the personal computer and television to allow the capabilities of the personal computer and content stored therein to be made accessible through the television.

Such connectivity would further obviate the need for STTs that provide functionality capable of being delivered by personal computers within the home.

A problem remains in getting personal computers to communicate with television sets. In some cases, a direct physical connection must be established between the television and the personal computer using, for example, a FireWire connector, Universal Serial Bus (USB) connector, or some other type of input. Often, the two devices do not have compatible connectors to allow for direct connectivity. When compatible connector types are available, such connectivity methods are limiting in that the personal computer must be tethered to the television while communicating. If a desktop computer and television are in different locations, it is sometimes not possible to connect the devices via cable due to the distance that may be involved. Even if the devices can be connected while in different rooms, there is generally no way to remotely control the personal computer.

The use of network-connected STTs obviates some of these problems. An STT can be used to access digital content stored on a personal computer over a data network for viewing on a television to which it is directly interfaced. Such STTs can be expensive and often provide functionality that overlaps with personal computers. Accordingly, there is a need in the art for an improved method, apparatus, and system that allows personal computers to connect with and stream digital content to a television over a data network without the need for a STT.

Wireless connectivity offers one of the most flexible means by which to connect a television and a personal computer. Short-range wireless capability using standards such as IEEE 802.11 (all current and future subsections), BLUETOOTH®, Ultra-Wideband (UWB), and others are presently being integrated into personal computers. Wireless technology obviates the need for cables and adapters, provides for mobility within a certain range, and also allows data to be remotely accessed from another location. LAN connectivity via Ethernet or powerlines within the home could also allow television sets and personal computers to interconnect. Unfortunately, a large base of installed digital televisions and those being sold on the market today do not provide for either wireless or wireline access to a data network. As such, there is a need in the art for a POD module that provides "add-on" network connectivity to existing television sets and other hosts, thereby eliminating the need for STTs that perform this function. There is a further need for a POD module that is capable of processing digital content (e.g., IPTV, video downloads, etc.) received via a data network such as a LAN, WAN, or the Internet. There is a further need for a POD module that facilitates the remote control of a media player device such as a personal computer over a data network, in order to manipulate the transmission of digital content between the media player and television.

FIG. 1 is a view illustrating a conventional cable card (or POD) module 150 connected to a host device 100. Referring to FIG. 1, the conventional cable card module 150 includes a conditional access (CA) decrypter 151, a copy protection (CP) encrypter 152, and a central processing unit (CPU) 153 to control the CA decrypter 151 and the CP encrypter 152. The host 100 includes a receiving unit receiving a cable signal through a cable television network cable 101 and having a tuner 102 and an out-of-band (OBB) modem 103 having a receiver (RX) 104 and a transmitter (TX) 105, a demodulator 106, a demultiplexer (DEMUX) 108, a CP decrypter 107, a second CPU 109 to control components of the host 100, an MPEG decoder 110, a graphics controller 111, a stereo audio codec unit 113, a display unit 112 and a speaker 114.

CableLabs' OpenCable™ specification defines the Point of Deployment module (POD or CableCARD module) 150 used in conjunction with the host device 100 such as the television or a set top terminal (STT), as depicted in FIG. 1. The OpenCable specification defines an interface between the host device 100 and the CableCARD module 150 that allows the host device 100 and the CableCARD module 150 to interoperate with each other even if the host device 100 and the CableCARD module 150 were produced by different vendors.

As illustrated in FIG. 1, the CableCARD module 150 is interfaced with the host device 100 via a CableCARD (or POD) interface. The cable 101 is used as a transmission medium to send the cable signal, such as content or data, to and from the host device 100. The content is supplied as a stream of modulated data (e.g., a modulated multiplexed MPEG-2 data stream) to the tuner 102 that selects a particular channel of the incoming content. The tuned content is provided to the demodulator 106, which is then provided to an inband (INB) data port of the CableCARD 150. The demodulated data stream is supplied to the Conditional Access (CA) decrypter module 151.

After the demodulated data stream is processed by the CA decrypter module 151, the demodulated data stream is re-encrypted by the Copy Protection (CP) encrypter 152 and is returned to the host device 100. Within the host device 100, the encrypted data is decrypted at the CP decrypter 107 and then supplied to the demultiplexer 108, which separates the multiplexed data stream into a MPEG compliant A/V signal. The demultiplexed data from the demultiplexer 108 is provided to the MPEG decoder 110 that decodes the MPEG data and presents the decoded MPEG data to the graphics controller 111 to process the MPEG data and output the processed data to the digital display unit 112, and the stereo audio codec module 113 processes an audio signal and outputs the processed audio signal to the speakers 114 which are integrated with the host device 100.

Out of Band data (OOB) can also be communicated via the cable 101 using the OOB modem 103 which, for example, may have a Quadrature Phase Shift Keying (QPSK) transmitter 105 and receiver 104. The CableCARD module 150 can also send and receive commands and information using the CPU 153, which communicates with the second CPU 109 of the host device 100 via the CPU port of the CableCARD module 150. The host device 100 may have a DOCSIS compliant modem (not illustrated) that further allows data received from a cable provider to be transmitted to the CableCARD module 150. Data transmitted from the CableCARD module 150 to the host device 100 may also be forwarded to the service provider through the DOCSIS compliant modem.

As described above, CableCARDs are one-way and do not provide for an Interactive Program Guide, Video on Demand control functions, interactive and enhanced services, pay-per-view, and other capabilities. Although two-way CableCARDs have been developed to provide some of the above features, a backward compatibility problem exists in that the host devices support only one-way CableCARD modules. Accordingly, there is a need for a two-way POD module that can work with an older generation of hosts that only support one-way communication. Even with a newer CableCARD that supports two-way communication, consumers are still faced with having to purchase multiple STTs that provide digital video recording and playback, multimedia time shifting, gaming, Internet downloading, and a remote access to digital content stored on network-connected media player devices such as personal computers and the like.

However, a conventional POD module cannot properly communicate with other personal electronic devices, such as personal digital assistants (PDAs), cellular phones, music players, video players, game players, etc. Such media player devices frequently store large amounts of digital content, are able to connect to the Internet, and exchange data with other electronic devices via a wire or wireless interface. As it may be desirable to view and/or listen to the digital content stored in the above devices through a television, there is a need for a POD module that can provide the necessary connectivity options and functionality to facilitate such operation.

SUMMARY OF THE INVENTION

An extended connectivity apparatus provides multimedia data from a multimedia source device to a multimedia presentation device. An electrical connector mechanically couples to a connector of the multimedia presentation device to provide a communication path to the multimedia presentation device. A wireless communication interface, which is selectively separable from the multimedia presentation device at the electrical connector, receives multimedia data over a wireless communication channel. A processor, which is also selectively separable from the multimedia presentation device at the electrical connector, encodes the received multimedia data into a format compatible with presentation capabilities of the multimedia presentation device and conveys the encoded multimedia data to the multimedia presentation device through the electrical connector.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
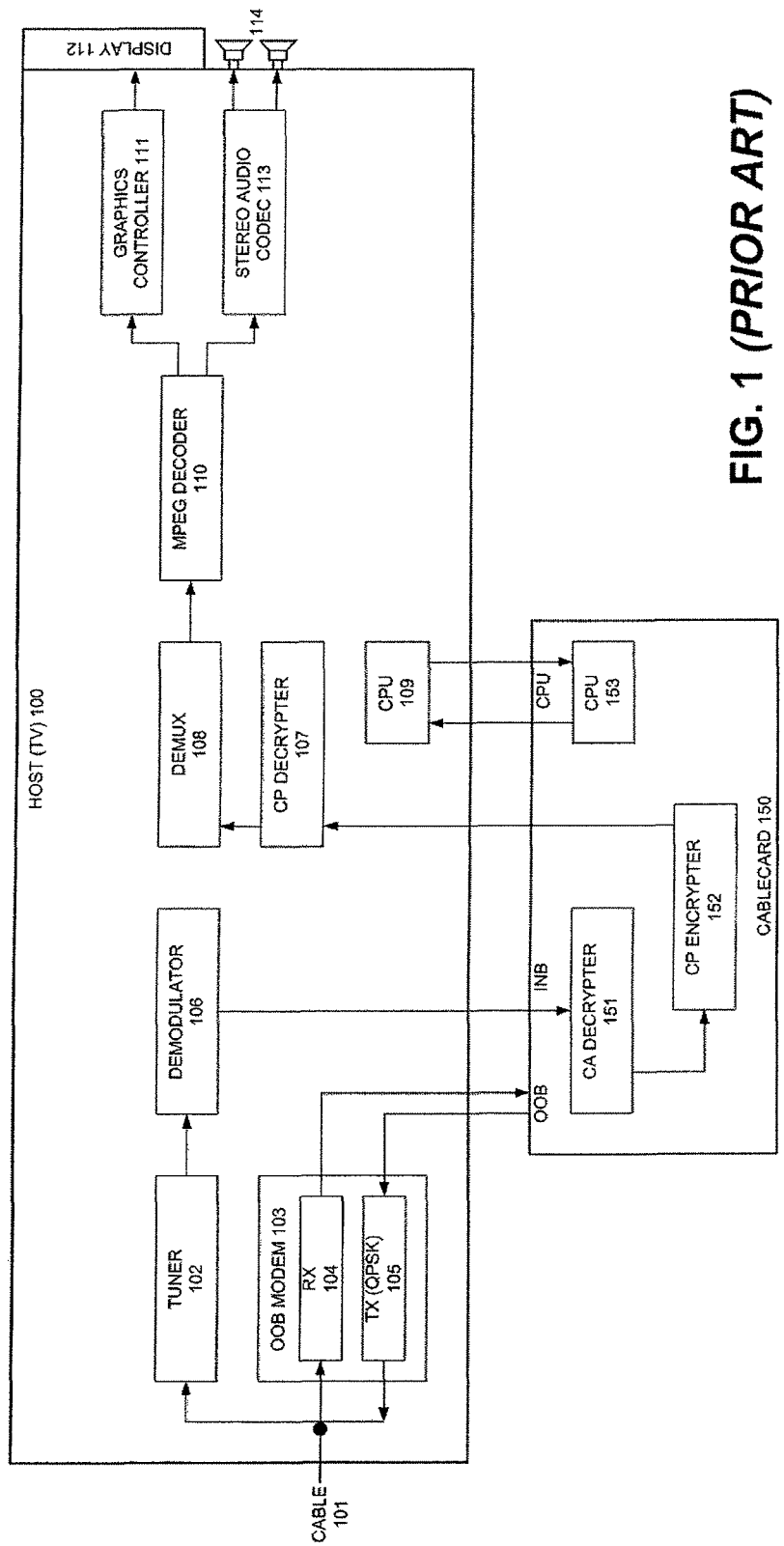
FIG. 1 is a block diagram illustrating a host device 100 and at least one associated CableCARD 150.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
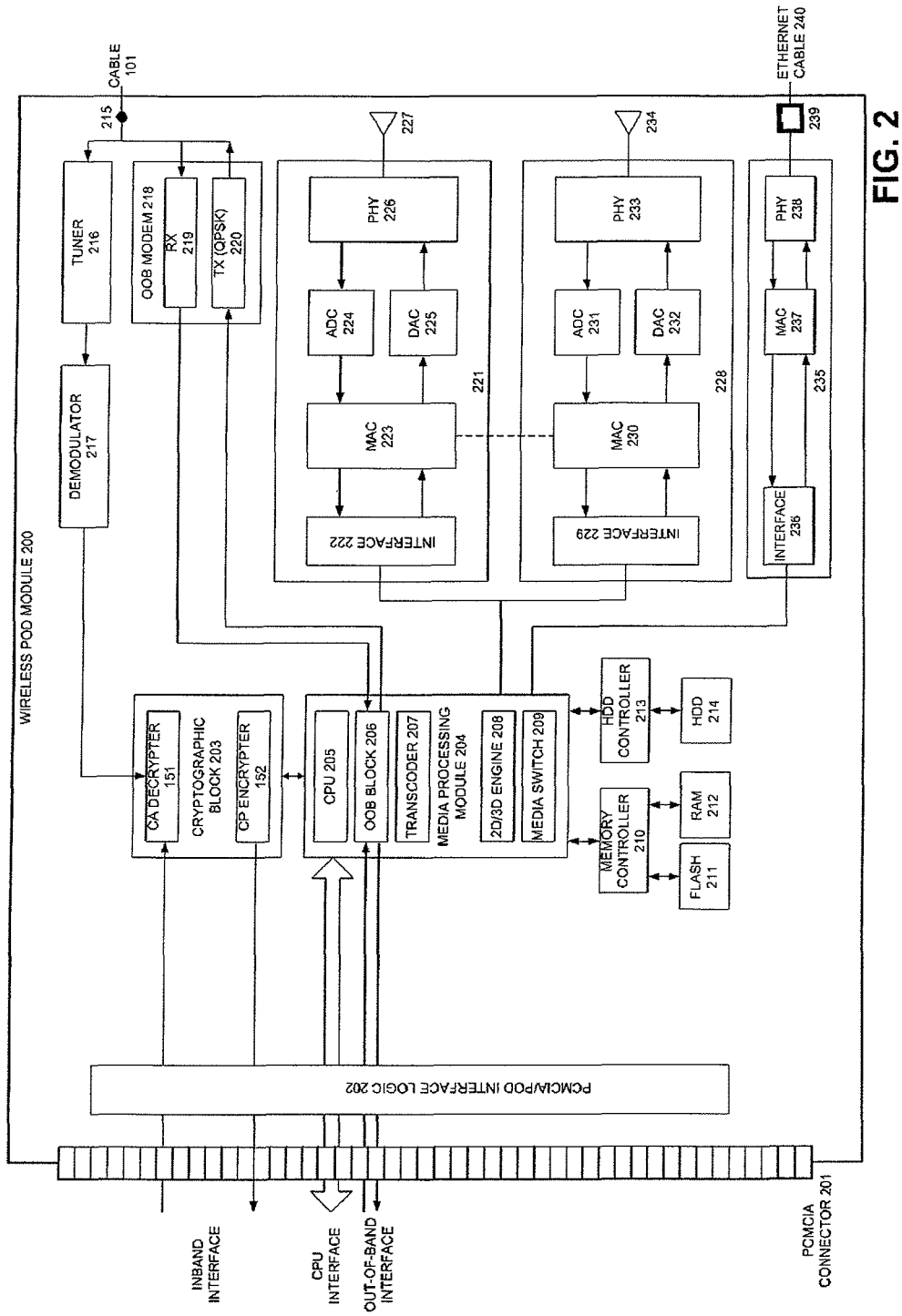
FIG. 2 is a block diagram illustrating components of a wireless POD module 200 according to an embodiment of the present general inventive concept.

FIG. 2 is a block diagram illustrating components of a wireless point of deployment (POD) module 200 according to an embodiment of the present general inventive concept. A set-top terminal (STT) may not be necessary to operate a host (e.g., television) connectable to an external network through the wireless module 200. The present embodiment described herein applies equally to all types of POD modules, including, but not limited to CableCARDs and Common Interface Modules Conditional Access (CA) devices, such as CableCARDs, are typically built in accordance with prescribed physical and electrical standards, to ensure compatibility with host devices manufactured by different vendors. The wireless POD module 200 which is described herein is embodied in a Personal Computer Memory Card International Association (PCMCIA) Type II form factor device that can be inserted into a CA slot of a host (e.g., television). The Personal Computer Memory Card International Association (PCMCIA) has published an industry standard corresponding to physical designs, dimensions, and electrical interfaces of PC cards. For example, the PCMCIA standards acknowledge, among other things, Type I, Type II, and Type III form factors where each form factor is characterized by specific dimensional and electrical attributes. All cards which conform to the various form factors of the PCMCIA standards have the same length and width. More specifically, all cards which conform to the various form factors of the PCMCIA standards are 85.6 millimeters long and 54 millimeters wide. However, a distinguishing physical characteristic among the various form factors of the PCMCIA standards involve thicknesses of each particular card. More specifically, Type I cards are 3.3 millimeters thick, Type II cards are 5.0 millimeters thick, and Type III cards are 10.5 millimeters thick.

The PCMCIA standard also defines a requisite electrical interface requirement corresponding to the card and the host device. The requisite electrical interface requirement includes a specified bus interface, and the host device must include at least one PCMCIA card slot, which includes one 68-pin electronic connector that is adapted to physically and electronically receive a card which conforms to a particular PCMCIA electrical and physical standard.

It will be appreciated that embodiments of the present general inventive concept may be integrated in or adapted to various other peripheral form factors, PC cards, memory cards, computer systems, STTs, and other devices.

In this embodiment, the wireless POD module 200 is designed and configured to CableLabs' CableCARD specifications in order to allow CableCARD-compliant host devices to interoperate. Other specifications could be utilized while remaining within the spirit and scope of the present general inventive concept.

The wireless POD module 200 includes a housing that encloses internally various electrical components which are integrated on a printed circuit board (PCB). In the present embodiment, the housing has a thickness or height which conforms to the PCMCIA Type II standard. The wireless POD module 200 includes an extending portion that protrudes outwardly when the card is received in the CA slot of the host. A recessed portion of the wireless POD module 200 incorporates, among other components, various types of connectors, which allow compatible cables to be interfaced with the wireless POD module 200 while the card is inserted in the CA slot of the host. In the present embodiment, one or more RF antennas which are integrated into the wireless POD module 200 are housed within the recessed portion thereof.

FIG. 2 illustrates components of the wireless POD module 200 but does not delineate which components would be housed in a recessed portion of a card as this could vary depending on a particular manufacturing design.

A connector 201 may be a PCMCIA connector having 68 standard sockets. The connector 201 communicates with electronic circuitry of the wireless POD module 200, is disposed at one end of the housing, and is configured to connect to a corresponding 68-pin connector of a CA card slot of a host 100 of FIG. 5. The wireless POD module 200 is inserted in the CA slot of the host 100 so that the connector 201 of the wireless POD module 200 is engaged by the connector of the CA slot. In this way, the wireless POD module 200 is physically and electrically connected to a host computer of the host 100 to facilitate communication between the electronic circuitry of the wireless POD module 200 and the host 100. Such communications are performed over an interface (PCMCIA/POD interface Logic) 202 and an interface of a card host (i.e., the host 100). The card host interface of the host 100 may include three sub-interfaces, such as a CPU interface, an inband interface, and an out-of-band interface. The card-host interface may support a myriad of different CableCARD specifications. For example, the CableCARD Interface 2.0 Specification defines a CableCARD device-host interface (CHI), which contains the three sub-interfaces supported herein. The card-host interface of the host 100 includes the CPU interface to support a command channel and an extended channel, the out-of-band (OOB) interface to receive out-of-band (OOB) data under two different delivery methods (ANSI/SCTE 55-1 2002 and ANSI/SCTE 55-2 2002), and the inband interface for MPEG-2 Transport Stream input and output.

The CPU interface carries all the communication between the application(s) running in the wireless POD module 200 and the host 100. This functionality includes an ability to support complex combinations of transactions between the wireless POD module 200 and the host 100, and an extensible set of functional primitives (objects), which allow the host 100 to provide resources to the wireless POD module 200. The wireless POD module 200 can send and receive commands using a CPU (e.g., processor, microprocessor, etc.) 205, which communicates with a CPU 109 of the host 100 via a CPU port of the connector 201 of the wireless POD module 200.

The interface 202 and/or the card-host interface may have an extended channel interface to enable information to be exchanged between the host 100 and the wireless POD module 200. For instance, the host 100 may transmit a message to indicate its device type (e.g., television, set-top box receiver, etc.). Similarly, the wireless POD module 200 may transmit a message to indicate its type. After the exchange of information and determination that the host 100 is in communication with the wireless POD module 200, certain bits of the interface 202 and/or the host interface of the host 100 are reconfigured to support out-of-band signaling and operate as an OOB interface.

The OOB interface may be implemented as a unidirectional communication path from the host 100 to the wireless POD module 200. Program data (e.g., system information, Entitlement Management Message, etc.) transmitted over the OOB interface may be modulated in accordance with any of a variety of modulation schemes. For example, the program data may undergo QPSK modulation. However, other modulation schemes may be performed according to the program data. The OOB interface may support bi-directional communications (e.g., 2-way QPSK signaling) as illustrated in FIG. 2. Messages from an out-of-band processing circuit of the host 100 can arrive at an OOB processing block 206.

The extended channel interface enables one or more copy protection keys to be established. The copy protection key is derived by an exchange of information between the host 100 and the wireless POD module 200. Either the host 100 or the wireless POD module 200 may initiate generation of the copy protection key.

The inband interface includes one or more multi-bit communication paths. For example, the inband interface can carry MPEG-2 transport packets in both directions. One or more scrambled streams of digital content may be received by the wireless POD module 200 from the host to perform descrambling. Accordingly, one or more copy protected bit streams may be transmitted from the wireless POD module 200 to the host. The copy protected bit stream features descrambled content which is received from the host that is encrypted with the previously negotiated copy protection key.

One or more streams of digital content received by the wireless POD module 200 via one of its other interfaces (e.g., cable, wireless, Ethernet, etc.), may be copy protected and transmitted to the host via the inband interface.

Transport stream formats other than MPEG-2 could be supported by the wireless POD module 200 while remaining within the scope and spirit of the present general inventive concept.

Referring still to FIG. 2, the wireless POD module 200 may include a media processing module 204, which may further include the CPU 205, an OOB processing block 206, a transcoder 207, a 2D/3D graphics engine 208, and a media switch 209. The CPU 205 controls and coordinates all wireless POD module 200 functions. All the components of the Media Processing Module 204 represented in FIG. 2 could be integrated onto one chip. The wireless POD module 200 may further include a PCMCIA/POD Interface block 202, a memory controller 210, a non-volatile memory (i.e., Flash) 211, a volatile memory (i.e., RAM) 212, a hard disk drive controller 213, a hard disk drive 214, a cryptographic block 203, a tuner 216, a demodulator 217, an OOB modem 218, a cable connector and support circuitry 215, an 802.11 radio transceiver 221, an 802.11 antenna 227, a BLUETOOTH radio transceiver 228, a BLUETOOTH antenna 234, an Ethernet transceiver 235, and an RJ45 connector and support circuitry 239.

While not depicted, the wireless POD module 200 may integrate a coin cell. The coin cell is a battery that supplies power to battery-backed memory which is deployed within the wireless POD module 200. For instance, a portion of volatile memory in the unit may be battery-backed to operate as non-volatile memory.

The cryptographic block 203 includes a CA decrypter 151 and a CP encrypter 152. Cryptographic block 203 may be configured as a field-programmable gate array (FPGA), application specific integrated circuit (ASIC), digital signal processor (DSP), etc. The cryptographic block 203 may be designed and configured to support multiple conditional access (CA) operations according to the teachings of U.S. patent application Ser. No. 10/815,484 filed on Mar. 31, 2004 and incorporated herein in its entirety by reference.

In the present embodiment, the Media Processing Module 204 incorporates a processor 205 (i.e., CPU or microprocessor) which is embodied in a chip with multiple cores. Single and dual core chips could also be used while remaining within the spirit and scope of the present general inventive concept. The processor 205 runs a real-time operating system to enable an efficient and predictable response to real-time events. The processor 205 is configured to execute instructions and to carry out operations associated with the wireless POD module 200. For example, using instructions retrieved from memory, the processor 205 may control reception and manipulation of input and output data between components of the wireless POD module 200. The processor 205 may execute an instruction while under control of an operating system or other software. The processor 205 can be a single-chip processor or can be implemented with multiple components.

The processor 205 may operate together with an operating system to execute computer code and produce and use data. The computer code and data may reside within a program storage block that is operatively coupled to the processor 205. The program storage block may include Read-Only Memory (ROM), Random-Access Memory (RAM), a hard disk drive (HDD), flash memory, etc. RAM is conventionally used by the processor as a general storage area and as scratch-pad memory, and can also be used to store input data and processed data. ROM can be used to store instructions or program code to be executed by the processor as well as other data. Hard disk drives can be used to store operating system software, application software, media content, and various other types of data, and can permit fast access to large amounts of stored data.

The Media Processing Module 204 further includes a transcoder 207, which may be an embedded software-based transcoder within the CPU 205. Alternatively, a transcoding function could be performed by a separate ASIC, FPGA, or DSP. Any suitable hardware, software, firmware or other transcoding method and/or apparatus can be utilized to accomplish the transcoding function without limitation.

The transcoder 207 is a multimedia transcoder to receive and process a plurality of television, video, audio, and image formats including MPEG-1, MPEG-2, MPEG-3, MPEG-4 (SP, ASP), MPEG-7, MPEG-21, DV, DivX-3/4/5, AVC/H.264, WMV9, H.323, Dolby Pro Logic, Dolby Digital (AC-3), MP2, MP3, L2, AAC, WMA9, JPEG, GIF, BMP, and PNG. The transcoded data which is output from the transcoder 207 is in an MPEG-2 data format. The transcoder 207 could support incoming data in formats other than those mentioned herein, and can output data in a format other than the MPEG-2 format while remaining within the spirit and scope of the present general inventive concept. Video transcoder functionality corresponding to POD or Cable-CARD modules is outlined in U.S. patent application Ser. No. 10/774,870 filed on Feb. 9, 2004. The transcoder 207 functionality specified herein incorporates elements of U.S. patent application Ser. No. 10/774,870, but is designed to accommodate processing of multimedia streams (television, video, audio, and image). The streams which require transcoding may either be received from the host 100 via the PCMCIA connector interface 201 of the wireless POD module 200, or externally via any of the wireless or wired interfaces of the wireless POD module 200. The wireless POD module 200 can capture media processing capability information of the host 100, and the transcoder 207 can use this media processing capability information to produce an output that is compatible with the host 100.

A discussion of how input media streams are processed by the wireless POD module 200 is now provided as a way to illustrate the function of various components. Television media streams received by the wireless POD module 200 via any of its interfaces may first be decrypted by the CA decrypter 151 and then transcoded to MPEG-2 by the transcoder 207.

The Media Switch 209 mediates between the microprocessor CPU 205, the hard disk drive (or other storage device) 214, and the memory 212. After input streams are transcoded, the MPEG stream is sent to the Media Switch 209. The Media Switch 209 buffers the MPEG stream into memory. The Media Switch 209 subsequently performs two operations if the user is viewing real-time programming through the host 100 (television). More specifically, the MPEG stream is simultaneously supplied to the CP encrypter 152 (to transmit the MPEG stream to the host 100 via the PCMCIA connector interface 201 in accordance with the OpenCable specifications), and is also written to the integrated hard disk drive 214 or other storage unit.

The Media Switch 209 can parse the resulting MPEG stream and can separate the resulting MPEG stream into video and audio components before storing the video and audio components on the hard disk drive 214. The Media Switch 209 then stores the video and audio components into temporary buffers. Events are recorded that indicate a type of component that has been found, where the component is located, and when the events occurred. Program logic is notified that the event has occurred and the data is extracted from the buffers.

The buffers allow the CPU to not be required to parse the MPEG stream in real time, thereby resulting in slower CPU and bus speeds, which translate to lower system costs.

Stored media can be manipulated using a multimedia time warping functionality of the wireless POD module 200. The multimedia time warping functionality allows users to view live programs with an option of instantly reviewing previous segments within a particular program, by using an integrated digital storage unit (e.g., the HDD 214) and operating software of the wireless POD module 200. In addition, the present general inventive concept allows a user to store selected television programs in the wireless POD module 200 while the user is simultaneously watching or reviewing another program.

As mentioned above, the video and audio components are stored on the integrated hard disk drive 214. When a desired program is requested to be displayed on the display unit 112 of the host 100, the video and audio components are extracted from the hard disk drive 214 and are reassembled by the Media Switch 209 into an MPEG stream. The MPEG stream is then sent to the CP encrypter 152 to be processed and subsequently returned to the host 100.

An accompanying BLUETOOTH remote control 510 (or keyboard) which is designed to operate with the wireless POD module 200 can be used to access stored content to be viewed on the display unit 112 of the host 100, and to manipulate the content during viewing. Command signals which originate from the remote control 510 are accepted via the BLUETOOTH transceiver 228 of the wireless POD module 200 and are processed by the CPU 205. These command signals affect a flow of the MPEG stream and allow the user to view stored content with at least the following functions: reverse, fast forward, play, pause, index, fast/slow reverse play, and fast/slow play.

In the present embodiment, the Media Switch 209 includes a data bus that connects to the CPU 205 and RAM 212. An address bus is also shared between the Media Switch 209, the CPU 205, and the RAM 212. The hard disk drive 214 is connected to one of the ports of the Media Switch 209. The Media Switch 209 may output content to the CP encrypter 152 (e.g., to output the content to the host 100) or to one of the wireless or wired interfaces (e.g., to output the content to a network-connected media device).

The Media Switch 209 can be implemented in hardware using a field-programmable gate array (FPGA), application specific integrated circuit (ASIC), digital signal processor (DSP), discrete logic or other configuration.

The multimedia time warping system of the wireless POD module 200 is similar to the functionality available in consumer DVRs such as those offered by TiVo™ and ReplayTV™. A multimedia time warping system is described in, for example, U.S. Pat. No. 6,233,389 assigned to TiVo, Inc. and hereby incorporated in its entirety by reference. Other multimedia time warping systems and methods could be incorporated in the wireless POD module 200 while remaining within the spirit and scope of the present general inventive concept.

Referring to FIG. 2, the wireless POD module 200 includes the hard disk drive 214 that gives the wireless POD module 200 a massive storage capacity. The hard disk drive 214 capacity may be widely varied (e.g., 10, 20, 50, 100 GB, etc.). In the present embodiment, the internal hard disk drive 214 is an ultra-high performance drive that interfaces with the Media Switch 209 via a serial ATA (SATA) hard disk drive controller 213. The wireless POD module 200 supports simultaneous reading and writing of multiple media streams from and to the hard disk drive 214.

The hard disk drive 214 could use any number of disk storage technologies capable of holding encoded information including optical, magnetic, holographic, etc. Other types of integrated or removable storage devices could be used in lieu of the hard disk drive 214 while remaining within the scope and spirit of the present general inventive concept. A designated storage unit may be used to store data, applications, programming or any other suitable information.

The wireless POD module 200 further integrates ultra-fast Random Access Memory (RAM) 212. In the present embodiment, the RAM 212 is Double Data Rate II (DDR2) memory. Other types of RAM could be used also. The RAM 212 interfaces with the Media Processing Module 204 through a memory controller 210.

The wireless POD module 200 also integrates a flash memory module 211 that provides non-volatile storage. The flash memory 211 also interfaces with the Media Processing Module 204 via the memory controller 210. The CPU 205 executes programs stored in the non-volatile flash memory 211.

Figure 5:
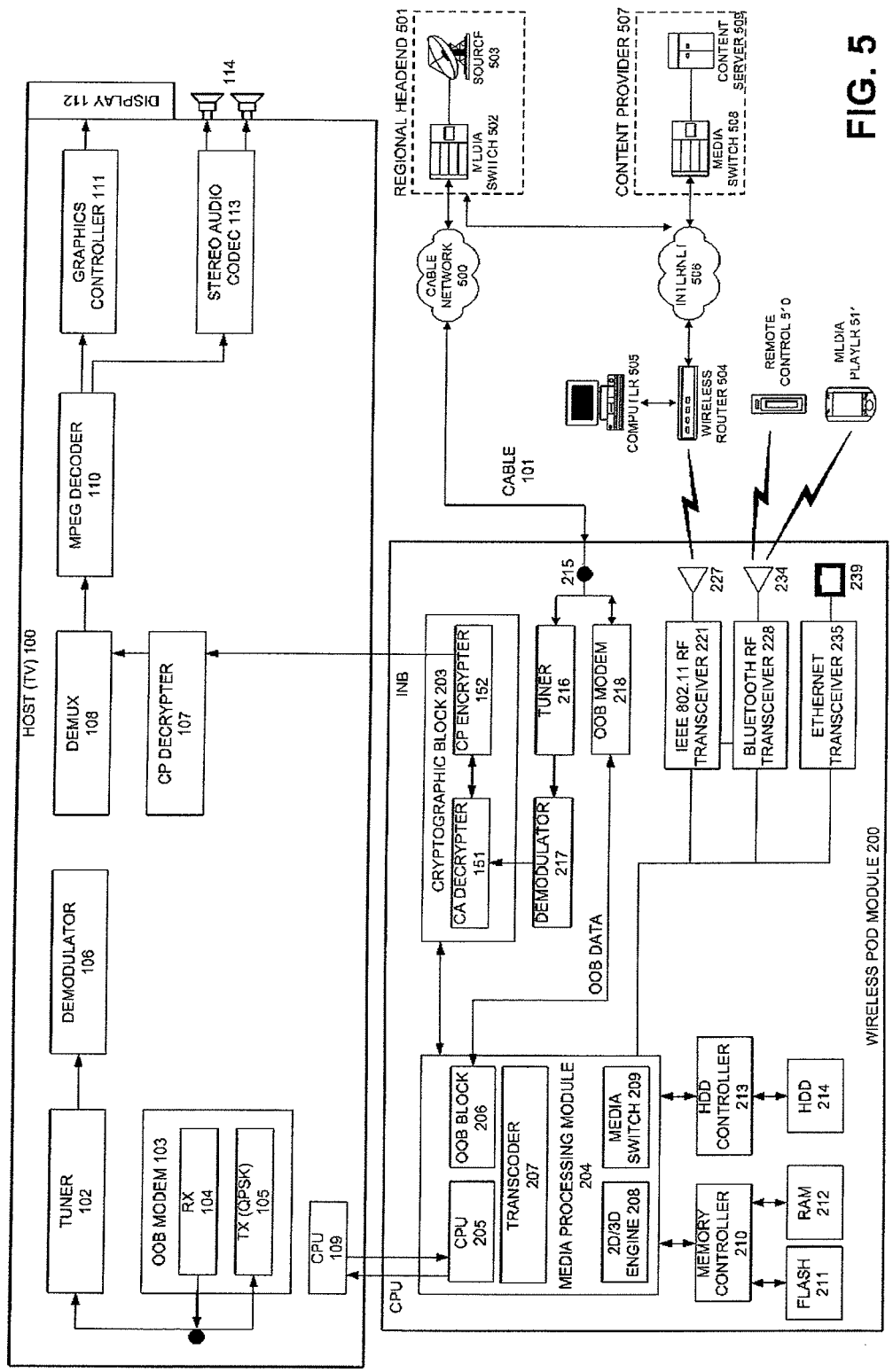
FIG. 5 is a block diagram illustrating a wireless POD module 200 to communicate with a host device 100 and a plurality of other devices through its various interfaces according to an embodiment of the present general inventive concept.

Referring to FIG. 5, an explanation of various interfaces of a wireless POD module 200 is provided to illustrate how media content may be received, processed and further transmitted. As previously mentioned, the wireless POD module 200 can be designed and configured to receive and process content from a host 100 in accordance with the OpenCable specifications. A cable television network cable 101 is connected to the host (e.g., television) 100 to provide the host 100 with cable television network content from a cable network 500 as illustrated in FIG. 5. The cable television network content is supplied as a stream of modulated data (e.g., a modulated multiplexed MPEG-2 data stream) to a tuner 102 within the host 100.

In accordance with the present general inventive concept, the wireless POD module 200 may be able to direct the tuner 102 within the host 100 to tune to a specific channel or out-of-band frequency. The wireless POD module 200 may direct the tuner 102 to tune to a channel or out-of-band frequency when a user utilizes an accompanying BLUETOOTH remote control 510 to send a signal to the wireless POD module 200 which further directs the host 100 to change channels, when a digital recorder of the wireless POD module 200 is set to begin recording a program, or when an interactive television application operates on the module 200. When the host 100 has multiple tuners, the POD module may direct the host 100 to tune multiple channels or out-of-band frequencies at the same time. For example, having multiple tuners within the host 100 allows the user to view a channel, record another channel, and obtain information from an out-of-band frequency at the same time.

Once the tuner 102 selects a particular channel of incoming content based on instructions from the POD module 200, the tuned content is further provided to a demodulator 106, which is then provided to the inband (INB) data port of the wireless POD module 200. Within the POD module 200, the demodulated data is provided to the CA decrypter 151 and is decrypted as previously described with reference to FIG. 2. The decrypted data is then supplied to a transcoder 207 (if required), which transforms the data into a format (e.g., MPEG-2) that is compatible with the host 100.

The Media Switch 209 then buffers the media stream into memory and performs two operations if the user is viewing live television. More specifically, the media stream is simultaneously supplied to a CP (Copy Protection) encrypter 152 to be transmitted to the host 100, and the media stream is also written to a hard disk drive 214 or other storage unit. Stored media can be accessed and manipulated using the BLUETOOTH remote control and the multimedia time warping system of the wireless POD module 200 as described above with reference to FIG. 2.

However, the host 100 may not be configured to allow a CA module to tune the tuner 102. As certain CA modules like the current generation of CableCARD's do not provide for an Interactive Program Guide, a user may only be limited to recording programs that are being viewed during recording. As a way to address such problems, the wireless POD module 200 may allow the host 100 to directly input/output to an antenna, satellite system, cable network, or other suitable source. The wireless POD module 200 may integrate multiple connectors in its housing and may be configured to process analog and digital signals received directly from a plurality of sources. Accordingly, the wireless POD module 200 may include multiple tuners and a demodulator which can a plurality of signal types.

The wireless POD module 200 may support National Television Standards Committee (NTSC), Système Électronique pour Couleur avec Mémoire (SECAM), Phase Alternating Line (PAL), and digital standards such as Digital Satellite System (DSS), Digital Broadcast Services (DBS), and Advanced Television Standards Committee (ATSC). The wireless POD module 200 may also support other input standards without being outside the spirit and scope of the present general inventive concept.

While not represented in FIG. 2, wireless POD module may include an analog decoder, such as an NTSC/PAL/SECAM decoder to decode analog channels. In such an arrangement, input signals enter through a tuner and are decoded by the NTSC/PAL/SECAM decoder. The decoded video and audio streams are encoded to MPEG-2.

Information may be modulated into the Vertical Blanking Interval (VBI) of the analog TV signal in a number of standard ways. More specifically, the North American Broadcast Teletext Standard (NABTS) may be used to modulate information onto lines 10 through 20 of an NTSC signal, while the FCC mandates the use of line 21 for Closed Caption (CC) and Extended Data Services (EDS). The wireless POD module 200 may include a Vertical Blanking Interval (VBI) data decoder to extract VBI data which is transmitted along with analog broadcasts.

The wireless POD module 200 of FIG. 2 allows the host 100 of FIG. 5 to directly connect to the cable television network cable 101 via an integrated coaxial cable connector and supporting circuitry 215. As illustrated in FIG. 2, the digital tuner 216 is connected to the digital demodulator 217, which converts the input signals to digital signals or packets. Accordingly, content which is supplied as a stream of modulated data (e.g., a modulated multiplexed MPEG-2 data stream) is input to the digital tuner 216. The digital tuner 216 could be tuned to a particular channel by a user via the accompanying BLUETOOTH remote control 510 of FIG. 5, or by an application running on the wireless POD module 200 (e.g., recording scheduler). The tuned content may be provided to the digital demodulator 217. Digital demodulator 217 may be a 64 or 256-quadrature amplitude modulation (QAM) demodulator or an ATSC 8-VSB demodulator and decoder. The tuned content is then provided from the digital demodulator 217 to the CA decrypter 151. The decrypted data is then supplied to the transcoder 207 (if required), which transforms the data into MPEG-2 media stream (or other format).

The Media Switch 209 then buffers the media stream into memory (e.g., the hard disk drive 214) and then performs two operations if the user is viewing live television. More specifically the media stream is simultaneously supplied to the CP (Copy Protection) encrypter 152 to be transmitted to the host 100, and is also written to the hard disk drive 214 or other storage unit. The output of stored media to the host 100 can manipulated using the accompanying BLUETOOTH remote control 510 and the multimedia time warping system of the wireless POD module 200 as previously described with reference to FIG. 2.

In some interactive television application systems, television distribution facilities transmit data packets that contain information used by interactive applications. Some systems transmit these packets on an out-of-band frequency. As illustrated in FIG. 2, the wireless POD module 200 includes an OOB modem 218 to receive and transmit OOB data from and to a cable provider's systems. The OOB modem 218 can include a Quadrature Phase Shift Keying (QPSK) transmitter 220 and a receiver 219. The OOB data received via the cable system is transmitted to the OOB processing block 206 of the Media Processing Module 204. The OOB block 206 processes OOB data in the exact same way as when it is received from the host 100 via the PCMCIA connector interface 201 or any other similar interface. The OOB block 206 also handles the transmission of OOB data to the cable system, via the QPSK transmitter 220.

The wireless POD module 200 can also receive digital content via one of its integrated RF interfaces, process the digital content, and transmit the processed content to the host 100 to be output as described above.

In the present embodiment, the wireless CableCARD 200 can have at least two radio transceivers, the 802.11 radio transceiver 221 and the BLUETOOTH radio transceiver 228.

The first radio transceiver 221 is compliant with IEEE 802.11 and is used to perform wireless local area network (WLAN) interfacing. The second radio transceiver 228 is compliant with BLUETOOTH and is used to directly interface a compatible remote control and other electronic devices with each other when in close proximity (e.g., cellular phones, PDAs, video players, music players, etc.).

The 802.11 radio transceiver 221 and the BLUETOOTH radio transceiver 228 each includes a processor interface 222 and 229, media-specific access control protocol (MAC) layer module 223 and 230, a digital-to-analog converter (DAC) 225 and 232, an analog-to-digital converter (ADC) 224 and 231 and a physical layer module (PHY) 226 and 233, respectively. To avoid interference between the 802.11 radio transceiver 221 and the BLUETOOTH radio transceiver 228, the MAC layer modules 223 and 230 of each radio transceiver may communicate with each other to avoid concurrent transmission and/or reception of wireless transmissions with corresponding external devices if such concurrent transmission or reception would cause interference. The methods by which the MAC layer modules 223 and 230 communicate are described in U.S. patent application Ser. No. 10/387,249 filed on Mar. 12, 2003, and incorporated herein in its entirety by reference. Other methods to cooperatively transmit data between wireless interface devices could be incorporated into the wireless POD module 200 while remaining within the scope and spirit of the present general inventive concept.

The 802.11 radio transceiver 221 and the BLUETOOTH radio transceiver 228 both include a host interface, digital receiver processing module, an ADC, a filtering/attenuation module, an intermediate frequency (IF) mixing down conversion stage, a receiver filter, a low noise amplifier, a transmitter/receiver switch, a local oscillation module, memory, a digital transmitter processing module, a DAC, a filtering/gain module, an IF mixing up conversion stage, a power amplifier, and a transmitter filter module. One possible radio transceiver design is specified in U.S. patent application Ser. No. 10/387, 249 filed on Mar. 12, 2003, and incorporated herein in its entirety by reference. Other radio transceiver designs could be incorporated into the wireless POD module 200 while remaining within the spirit and scope of the present general inventive concept.

In the present embodiment, a transmitter/receiver switch of the 802.11 radio transceiver 221 and a transmitter/receiver switch of the BLUETOOTH radio transceiver 228 are coupled to separate antennas 227 and 234, respectively. A transmit path and a receive path of each transceiver shares the same antenna. In an alternate embodiment, a separate antenna corresponding to a transmit path and a receive path of each transceiver may be incorporated. As one of ordinary skill in the art will appreciate, the antennas may be polarized, directional, and physically separated to provide a minimal amount of interference.

The 802.11 radio transceiver 221 and BLUETOOTH radio transceiver 228 interface with the Media Processing Module 204 via processor interface 222 and 229, respectively. The processor interfaces 222 and 229 provide bidirectional communication between the Media Processing Module 204, the 802.11 radio transceiver 221, and the BLUETOOTH radio transceiver 228 via GPIO (General Purpose Input/Output) interfaces. For example, media which is received via one either 802.11 radio transceiver 221 or the BLUETOOTH radio transceiver 228 (e.g., inbound data) is transmitted to the Media Processing Module 204 via a GPIO port to process and route to an appropriate section.

The wireless POD module 200 could support alternate RF communication protocols (e.g., Ultra-Wideband, WiMedia™, Wireless USB, Wireless 1394, WiMAX, etc.) while remaining within the spirit and scope of the present general inventive concept. The wireless POD module 200 may additionally integrate one or more RF receivers such as, radio receivers (e.g., AM, FM, Shortwave, Longwave, HD, weatherband, and Digital Audio Broadcasting), satellite radio receivers (e.g., Digital Audio Radio Services such as XMTM and Sirius™), and television receivers (e.g., ATSC UHF/VHF). The wireless POD module 200 may additionally integrate a datacast receiver in support of over-the-air content services. An example of a datacast receiver which may be integrated in the wireless POD module 200 is the dNTSCTM receiver from Dotcast, Inc. The dNTSCTM receiver may be integrated to enable a subscription-based video service such as MovieBeam™. Video and other programming content which is delivered over-the-air to a datacast receiver which is integrated in the wireless POD module 200 is processed by the Media Processing Module 204 and stored in the hard disk drive 214 to be available to be viewed at a future time via the host 100 or other device.

As illustrated in FIG. 2, the wireless POD module 200 also provides connectivity to a data network such as a LAN, WAN, or the Internet via an integrated Ethernet port 239 and Ethernet module 235. In the present embodiment, the Ethernet module 235 is a fully-integrated 10BASE-T/100BASE-TX/1000BASE-T Ethernet media access control and physical layer transceiver. The Ethernet module 235 combines a triple speed, IEEE 802.3 compliant media access controller (MAC) 237, PCI bus interfaces 236, an on-chip buffer memory, and an integrated physical layer transceiver in a single chip.

The Ethernet module 235 is fully compatible with the IEEE 802.3 standard for auto-negotiation of speed. The Ethernet module 235 includes a 10/100/1000-Mbps Ethernet MAC 237 with full/half-duplex capability at all speeds and a 10/100/1000 copper PHY 238. The MAC supports the following 802.3 functions, including VLAN tagging, layer 2 priority encoding, link aggregation, and full-duplex flow control.

The Ethernet module 235 provides a PCI v2.2 bus interface and a large on-chip buffer memory to allow a stand-alone operation. Dual, on-chip, high performance processors enable custom frame processing features, including TCP segmentation.

The wireless POD module 200 can receive digital content via an Ethernet interface 236, process the digital content, and transmit the digital content to the host 100 of FIG. 5 to be output. Content received in the Ethernet module 235 is transmitted to the Media Processing Module 204 via the interface 236. Digital content which is received by the Media Processing Module 204 is processed in the same manner as content received via another interface of the wireless POD module 200, as mentioned above. For example, content (e.g., IPTV) which is received via the Ethernet interface 236 may first need to be decrypted by CA decrypter 151 and transcoded by transcoder 207, before being simultaneously written to the integrated storage unit (i.e., the hard disk drive) 214 and output to the host 100 via the PCMCIA connector interface 201.

The wireless POD module 200 illustrated in FIG. 2 interfaces directly with the cable network 500 of FIG. 5. As mentioned above, the wireless POD module 200 also includes the 802.11 RF interface 222, the BLUETOOTH RF interface 229, and the Ethernet interface 236. Any of the above interfaces could be used to connect to a data network and exchange data with the cable provider's systems. Such interfaces could be used to transmit orders, user information, requests corresponding to billing information, requests corresponding to programming information, etc. The requests, orders, and information may correspond to interactive televisions services and transactional electronic services, such as, ordering pay-per-view programs, requesting video-on-demand programs, subscribing to premium channels, at-home shopping, providing feedback, or any other suitable interactive or transactional service.

The above interfaces could also be used to receive programming content and other data from the cable provider or other content provider on the Internet (e.g., YouTube, Yahoo!, Apple iTunes Store, etc.). The 802.11 RF interface 222 and the Ethernet interface 236 could also be used to connect with other electronic devices directly or over a data network such as LAN, WAN, or the Internet. The 802.11 RF interface 222 and the Ethernet interface 236 could also be used to transmit stored content or content being processed by the wireless POD module 200.

The wireless POD module 200 could in an alternate embodiment incorporate a variety of other wired and wireless interfaces. For example, the wireless POD module 200 may incorporate in its recessed portion, one or more proprietary connectors, universal serial bus (USB) connectors, IEEE 1394 connectors (i.e., Firewire), a small computer systems interface (SCSI) connector, a serial connector, a parallel connector, RS232 connector, optical connector, powerline connector (to access a data network over powerlines in accordance with HomePlug specifications), etc.

The wireless POD module 200 could additionally incorporate a variety of input/output connectors for audio and video in its recessed portion. These include, but are not limited to, connectors such as HDMI video and audio, component video, analog audio, and optical digital audio.

In another embodiment, the wireless POD module 200 may include an embedded cable on its outside edge, which protrudes out of the card slot and contains all its supported connectors. An end of the embedded cable could additionally contain an infrared (IR) receiver and an IR blaster connector, which could interface with an IR controller within the wireless POD module 200. The IR receiver may receive commands from a remote control and the IR blaster may transmit commands from the wireless POD module 200 to the POD host or other equipment to which it may be interfaced.

In another embodiment, the wireless POD module 200 may integrate a cable modem, a digital subscriber line (DSL) modem, a telephone modem, optical network terminal (ONT), RF base modem, wireless access point/router, or other suitable controller to communicate via a communications network. Such communications circuitry would be entirely integrated within the wireless POD module 200.

The wireless POD module 200 could further integrate a supplementary storage component to allow an insertion and removal of a secondary storage device such as a flash memory card, microdrive, secure digital (SD) memory card, extreme digital (xD) card, a floppy disk, CD, DVD, etc.

In the present embodiment, wireless POD module 200 has the ability to communicate with the host 100 to generate a graphical user interface (GUI) and related images on a display 112. The wireless POD module 200 transmits display screen data that is received and processed by the host 100r to display the images on the display 112. Wireless POD module 200 may transmit the display screen data to the host 100 in a variety of formats. For example, the display screen data may be transmitted to the host 100 as a stream of video (e.g., MPEG-2), static images (e.g., JPG), or may use any suitable markup language (e.g., Hyper-Text Markup Language (HTML), Dynamic Hypertext Markup Language (DHTML), pages defined using the Extensible Markup Language (XML), JavaServer Pages (JSP), Active Server Pages (ASP)), or any other suitable data formats.

As wireless POD module 200 is designed to work with the current install base of televisions with CA slots (e.g., Cable-CARD slots), the transmission of data between the wireless POD module 200 and the host 100 may be limited to MPEG-2. To allow backward compatibility with existing televisions and other host devices, the wireless POD module 200 has the ability to receive and process content in a plurality of different formats including the formats mentioned above, and can use the processed data to generate and transmit a video stream (e.g., MPEG-2) to the host 100.

In addition, the present general inventive concept allows the user to store selected media programming in the wireless POD module 200. The system also allows stored media assets to be transmitted to the host 100 or to a media device which is connected to a data network such as a LAN, WAN, or the Internet.

In the present embodiment, the operating system of the wireless POD module 200 supports the core functionality of the device as described herein. In the present embodiment, the operating system and software that may operate on the wireless POD module 200 can receive updates automatically via a data network such as the Internet. The operating system of the wireless POD module 200 may be stored in programmable logic of the processor 205, or in the hard disk drive 214.

The operating system can support TCP, UDP, ICMP, RARP, ARP, DNS, DHCP, NTP, SNTP, STUN, HTTP, and TFTP. Other protocols could also be supported. The operating system supports IPv4 and IPv6 network addressing.

The operating system of the wireless POD module 200 may incorporate various auto-configuration protocols and standards which can be employed to establish the wireless POD module 200 on a data network. For example, the wireless POD module 200 may employ the Dynamic Host Configuration Protocol (DHCP) to automatically obtain network settings and configuration parameters such as an Internet Protocol (IP) address, netmask, gateway address, and DNS server address.

Bonjour may also be supported by the wireless POD module 200. Bonjour enables automatic discovery of computers, devices, and services on IP networks. Bonjour is an "open" protocol that Apple Computer, Inc. (Cupertino, Calif.) has submitted to the IETF as part of the ongoing standards-creation process. The wireless POD module 200 may additionally support the Universal Plug and Play (UPnP™) standards, Intel Networked Media Product Requirements (NMPR), and Digital Living Network Alliance (DLNA) guidelines.

The wireless POD module 200 may employ such auto-configuration protocols and standards to establish itself on the LAN and "discover" media player devices running a media server application software that allows digital content to be streamed to and from the wireless POD module 200.

The wireless POD module 200 may also allow manual configuration of settings, security keys, and other parameters via a web browser operating on a computing device which is connected to a data network. An accompanying BLUETOOTH remote control 510 can also be used in conjunction with the host's display 113 to configure the wireless POD module 200.

The operating system of the wireless POD module 200 or an application running thereon may enable other features including interactive program guide, recording scheduler, interactive television, parental controls, multimedia time shifting, multimedia location shifting (streaming of live content via the Internet), voice over Internet Protocol (VOIP), video over Internet Protocol, web browsing, instant messaging, e-mail, interactive shopping, and video gaming.

In support of voice and video over IP, the operating system of the wireless POD module 200 incorporates an open standard call processing module based on SIP v2 (Session Initiation Protocol version 2, RFC 3261) open standard, which is interoperable with major SIP-based call servers and other standard SIP-based devices.

The call processing module may be configured to maintain an SIP registration with an SIP-based call server on the service provider network. The call processing module may allow the SIP to be used to originate and terminate voice and video calls. According to the present embodiment, wireless handset devices that enable two-way communication can be configured to interoperate with the wireless POD module 200. These handset devices may communicate with the wireless POD module 200 directly or through a wireless access point on the LAN using a common wireless standard (e.g., 802.11n). Handsets may be configured to enable voice and/or video communications. In another embodiment, a USB-based digital camera with an integrated microphone can be directly connected to a wireless POD module 200 that has an integrated USB port to connect such devices. This USB-camera and microphone unit can be mounted on top of the television to facilitate voice and video communication through the network-connected wireless POD Module 200. According to the present general inventive concept, incoming voice and video data received during a call is processed by the media processing module 204 of the wireless POD module 200, and is output to the host 100 (television) in the manner previously described. The USB camera and microphone module in turn capture video and audio, which are processed by the wireless POD module 200 and transmitted to an SIP-based call server or other SIP client via a network like the Internet. In support of these communication features, the BLUETOOTH remote control 510 which accompanies the wireless POD module 200 may integrate specific call control buttons that allow the wireless POD module 200 to answer or terminate communication sessions. Additionally, the remote control 510 may include buttons to dial E.164 numbers, to perform conference calling, and other operations.

The operating system of the wireless POD module 200 supports voice signaling protocols (SIP, MGCP, H.323, SDP, RTP, RTCP, RFC 2833 X-NSE Tone Events corresponding to SIP/RTP, and RFC 2833 AVT Tone Events corresponding to SIP/RTP), packetizing (RTP, Jitter Buffer), voice processing (echo cancellation, voice compression, DTMF, etc.) and reference hardware-specific drivers (corresponding to audio and/or telephony devices). The operating system may additionally support fax communication and G.711 Fax Pass-Through, T.38—Real-Time Fax Over IP, T.38 using UDP, and T.38 using RTP.

In an embodiment of the present general inventive concept, the wireless POD module 200 utilizes SIP to perform call signaling and supports numerous SIP extensions and methods. The wireless POD module 200 supports essential routing features, including Routing with Network Address Port Translation (NAPT) and support of Virtual Private Network pass-through. The wireless POD module 200 also offers STUN (Simple Traversal of UDP Through NAT), TURN (Traversal Using Relay NAT), RSIP (Realm Specific IP) and outbound proxy support for NAT traversal. Other NAT traversal techniques may also be supported by the unit as various new standards and technologies develop and are deployed. One such NAT traversal technique includes the Interactive Connectivity Establishment (ICE), developed by the IETF's MMUSIC working group. ICE provides a framework to unify the various NAT traversal techniques. This enables SIP-based VOIP clients to successfully traverse the variety of firewalls that may exist between a remote user and a network.

The wireless POD module 200 also prioritizes telephone calls over other Internet traffic to allow users to obtain clearer voice quality comparable to analog voice service over a circuit-switched network. The wireless POD module 200 may also offer rich CLASS features corresponding to enhanced telephony services such as call waiting, three way calling, caller ID, etc. With respect to caller ID, the wireless POD module 200 can overlay caller ID data with television programming which is to be displayed through the host 100.

Currently, VOIP service providers must maintain an interface to the circuit-switched PSTN in order to route calls to and from other carriers. As all circuit-switched traffic is likely to migrate to packet networks such as the Internet in the future, the need to maintain a PSTN interface will likely be eliminated. In the future, Electronic Numbering (ENUM) may be used to resolve a fully qualified E.164 telephone number corresponding to a particular wired or wireless device to a fully qualified domain name address using a DNS-based architecture. ENUM (RFC 3761) is the Internet Engineering Task Force (IETF) standard that defines a mechanism which uses the Domain Name Service (DNS) as a tool to "discover" services associated with a telephone number (E.164 number).

In accordance with the present general inventive concept, the operating system of the wireless POD module 200 incorporates an ENUM engine and a built-in DNS resolver. The ENUM engine is a standard compliant resolution tool developed based on IETF's RFC 3761. The ENUM engine provides the DNS message processing and network transport mechanisms required to translate a telephone number into a set of ENUM records. The ENUM engine supports DNSSEC and TSIG to address a variety of security issues. The ENUM engine automatically processes NAPTR record(s) in DNS wire format into application service, order, preference, and URI fields. Additionally, the ENUM engine correctly parses the NAPTR service fields and dynamically interprets POSIX Extended Regular Expressions. The ENUM engine can filter the results of the parsing and interpretation based on application protocol and/or service type.

As an enabler of voice and video communication via the Internet, the wireless POD module 200 may have one or more E.164 phone numbers associated with it.

Users can connect to the wireless POD module 200 over a data network such as the Internet to access the Interactive Program Guide and set recording schedules, access media content stored in the integrated storage unit, access live programming being processed by the wireless POD module 200, etc. The wireless POD module 200 provides users remote access to live programming being input to the device, similar to functionality available with devices such as Slingbox™ from Sling Media, Inc., or the LocationFree™ base station from Sony.

In accordance with the present embodiment of the present general inventive concept, users can target and connect to a wireless POD module 200 using a media player application or device that supports the ENUM protocol and provides a connection with a target device using an E.164 number. A method and system to access stored media assets in a storage device via the Internet using E.164 telephone numbers, Uniform Resource Identifiers (URIs), and other address schemes is specified in co-pending U.S. patent application Ser. No. 11/205,639 filed by the Applicant, and incorporated herein in its entirety. A method and system to access live programming via the Internet using E.164 telephone numbers, URIs, and other address schemes is specified in co-pending U.S. patent application Ser. No. 11/341,715 filed by the Applicant, and incorporated herein in its entirety. U.S. patent application Ser. No. 11/341,715 also specifies methods of using multimedia time warping functionality over a data network, which is also supported by the wireless POD module 200.

Other methods could be used to access the wireless POD module 200 via a data network while remaining within the spirit and scope of the present general inventive concept. For example, the wireless POD module 200 can maintain a registration and open connection with a server which is connected to the Internet. When a user desires to connect to his wireless POD module 200, the user may be required to login to the server using a valid username and password. Once the user is authenticated, the user is connected to his wireless POD module 200 via the open connection.

In the present embodiment, video games may be downloaded from a service provider over a data network to the wireless POD module 200, and run thereon. In another embodiment, the operating system of the wireless POD module 200 may provide features to a gaming terminal (e.g., Microsoft Xbox 360, Sony PlayStation, Nintendo GameCube, personal computer, etc.) over a data network. The gaming terminal may provide for bi-directional function calls between the operating system of the wireless POD module 200 over a data network via an application programming interface (API). The API may provide functions that, for example, allow the remote gaming terminal to access wireless POD module 200 resources such as on-screen display resources, communications channel resources, memory function resources, controller resources, and other resources. The operating system of the wireless POD module 200 provides interoperability with wireless joysticks or other controller devices that may be included with gaming terminals as mentioned above. The wireless POD module 200 may in turn receive control signals from such controller devices, process the signals and transmit the processed signals to the respective gaming terminal via a data network.

Figure 3:
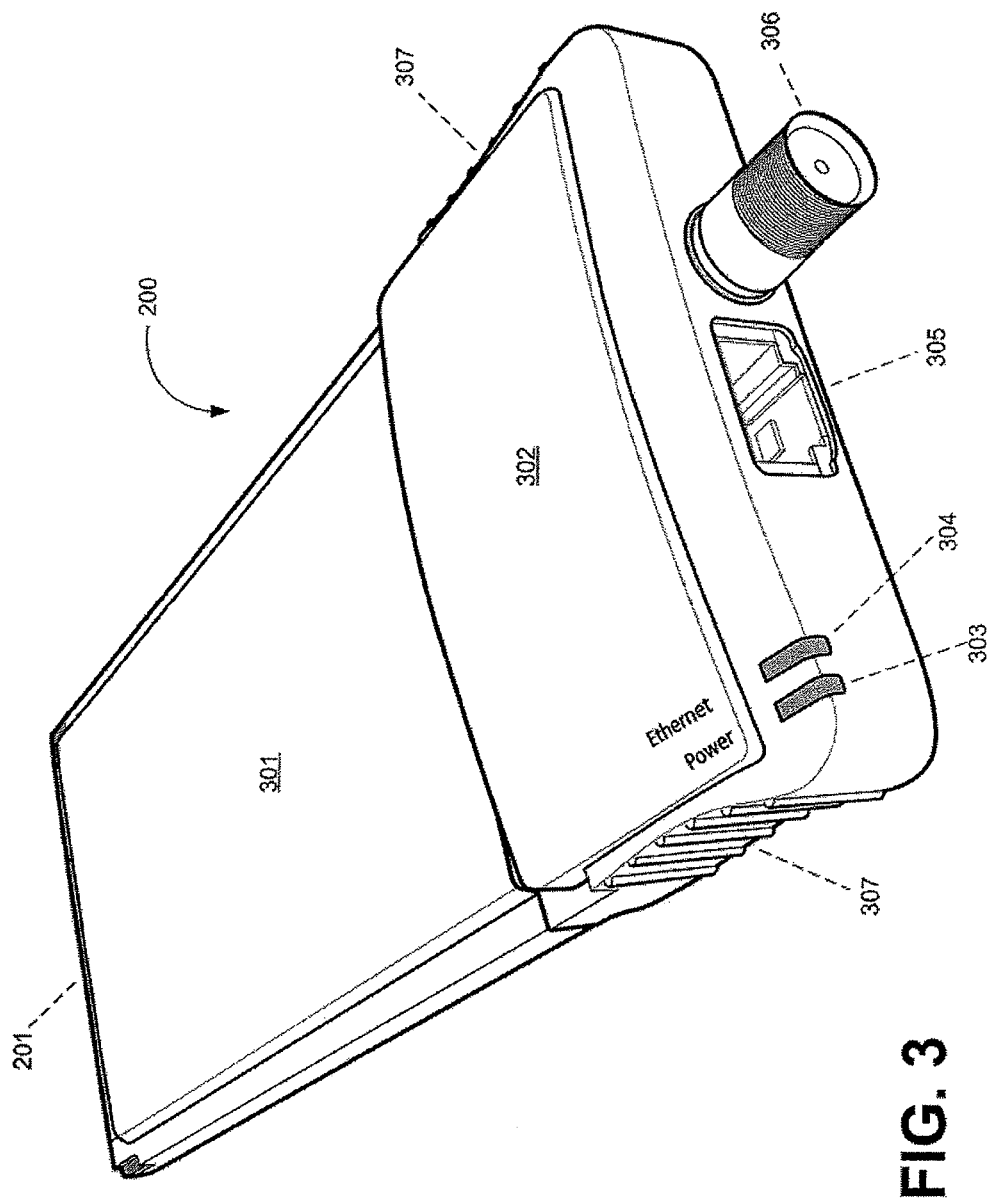
FIG. 3 is a front perspective view illustrating a wireless POD module 200 according to an embodiment of the present general inventive concept.

FIG. 3 is a front perspective view illustrating the wireless POD module 200 of FIG. 2. Referring to FIGS. 2 and 3, the wireless POD module 200 conforms to a PCMCIA II form factor device. The wireless POD module 200 includes a main housing 301, which includes the standard PCMCIA 68 socket connectors 201 at one end to interface with the host 100 of FIG. 5. The wireless POD module 200 further includes a recessed portion 302, which is designed to protrude from a CA slot of the host 100 when the wireless POD module 200 is inserted therein. The recessed portion 302 includes a RJ45 (Ethernet) port 305 to connect the wireless POD module 200 to a LAN switch or other device using an Ethernet cable, and a coaxial cable connector 306 to receive a cable network cable 101. Both connectors are centered within the recessed portion 302 of the wireless POD module 200. Also contained in the recessed portion 302 is a "power" light-emitting diode (LED) 303, which becomes lit when the wireless POD module 200 is inserted into the CA slot and receives power from the host 100. An "Ethernet" LED 304 is also included in the recessed portion 302, and becomes lit when an Ethernet cable that is connected on one end to a functioning network device such as a LAN switch is connected to the Ethernet port 305. Both LEDs are positioned at an edge of the recessed portion of the wireless POD module 200 which allows them to be visible from a top view or a front (side) view of the device.

The recessed portion 302 of the wireless POD module 200 has grooves 307 at opposing sides thereof, to allow users to easily remove the wireless POD module 200 from the CA slot of the host 100 when required.

The top panel of the recessed portion 302 may bear the name and/or logo of the wireless POD module manufacturer and/or other information.

Figure 4:
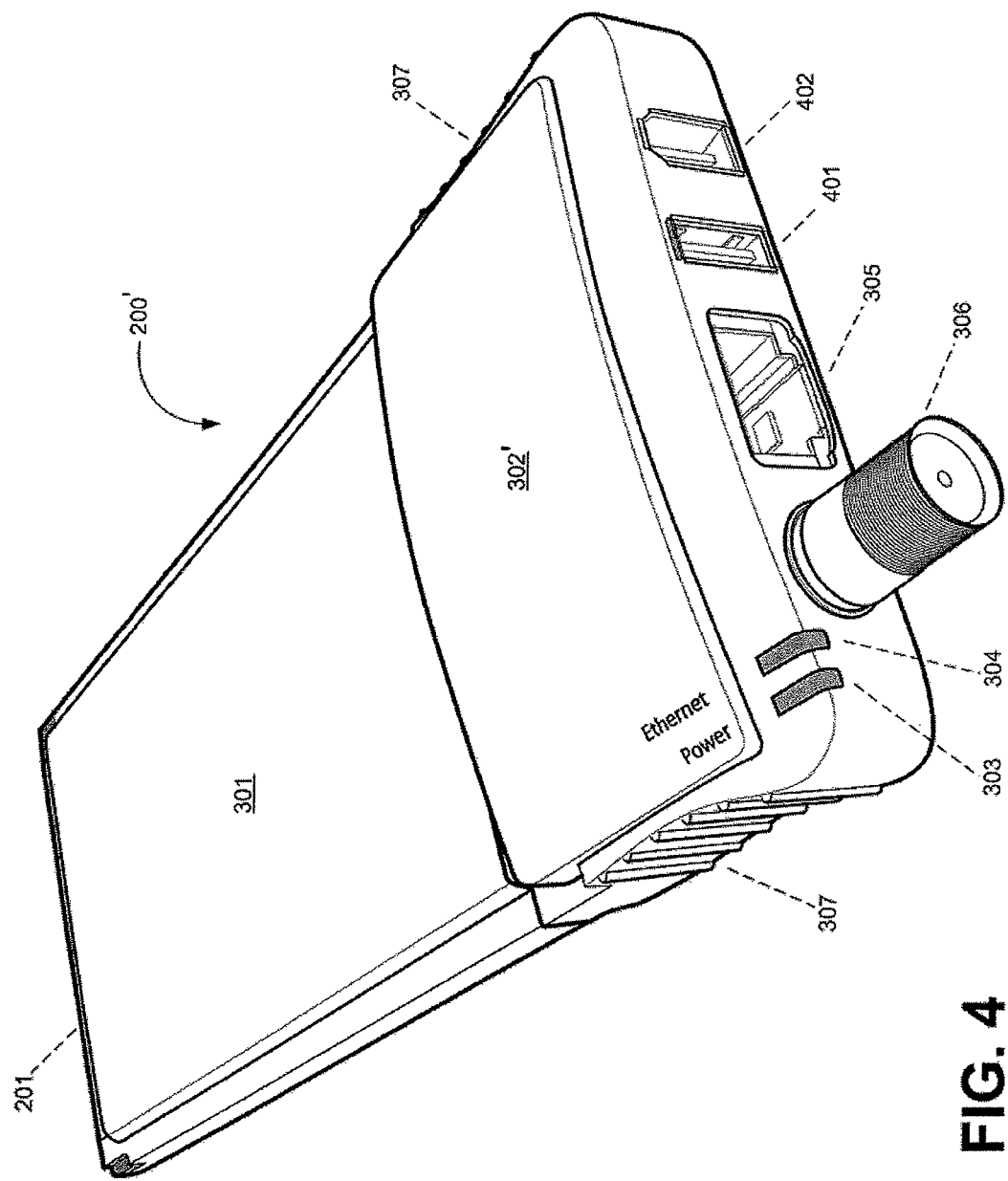
FIG. 4 is a front perspective view illustrating a wireless POD module 200' according to another embodiment of the present general inventive concept.

FIG. 4 is a front perspective view illustrating the wireless POD module 200 of FIG. 2. Referring to FIGS. 2 and 4, the wireless POD module 200 also conforms to a PCMCIA Type II form factor device, and includes a main housing 301 with PCMCIA 68 socket connectors 201, and a recessed portion 302'. The recessed portion 302' as described with reference to FIG. 4 is different from the recessed portion 302 as illustrated in FIG. 3, in that the recessed portion 302' of FIG. 4 includes a USB connector 401 and a 1394 (firewire) connector 402, in addition to a coaxial cable connector 306 and an Ethernet connector 305. The USB connector 401 and the 1394 (firewire) connector 402 allow the wireless POD module 200 to establish high-speed connectivity with other electronic devices and exchange data therein. The USB connector 401 and the 1394 connector 402 could be used to connect a camera-microphone unit to enable voice and video over IP. Other devices that can be connected therein include portable storage devices, camcorders, digital cameras, PDAs, video players, music players, etc. While the USB connector 401 and the 1394 (firewire) connector 402 and transceivers were not represented in the block diagram in FIG. 2, it will be appreciated that such components could be incorporated as required. It will also be appreciated that various other physical embodiments of the wireless POD module 200 could be employed that have different types, combinations, and/or arrangements of connectors. The wireless POD module 200 may autodetect devices that may be connected to integrated connectors using Universal Plug and Play (UPnP™) or similar standards.

FIG. 5 is a block diagram illustrating the wireless POD module 200 of FIG. 2 to communicate with a host device 100 and a plurality of other devices through its various interfaces according to an embodiment of the present general inventive concept. Referring to FIGS. 2 and 5, a wireless POD module 200 is inserted in the CA slot of a host (television) 100. A cable network cable 101 connects to the coaxial cable connector 215 in the wireless POD module 200. Cable 101 interfaces with a cable provider's network 500 and receives television programming transmitted from a regional cable headend 501. The cable headend 501 may include, among other things, source satellites 503 to receive television programming from content providers, as well as media switches 502 to transmit the programming signals to users via the cable network 500 or via the Internet 506 during IPTV.

As illustrated in FIG. 5, the digital tuner 216 is connected to the digital demodulator 217, which converts the input signals from the coaxial cable to digital signals or packets. Accordingly, content supplied as a stream of modulated data (e.g., a modulated multiplexed MPEG-2 data stream) is input to an integrated tuner 216. The tuner 216 could be tuned to a particular channel by the user via the accompanying BLUETOOTH remote control 510, or by an application running on the wireless POD module 200 (e.g., recording scheduler). The tuned content may be provided to the digital demodulator 217. The digital demodulator 217 may be a 64 or 256-quadrature amplitude modulation (QAM) demodulator or an ATSC 8-VSB demodulator and decoder. The content may then be provided to the CA decrypter 151. The decrypted data is then supplied to the transcoder 207 (if required), which transforms the data into MPEG-2 media stream (or other format).

The Media Switch 209 of FIG. 5 then buffers the media stream into memory and then performs two operations if the user is viewing live television. More specifically, the media stream is simultaneously supplied to CP (Copy Protection) encrypter 152 to encrypt the media stream and transmit the encrypted media stream to the host 100 via the inband interface, and is also written to the integrated hard disk drive 214 or other storage unit. As mentioned earlier, the wireless POD module 200 may function as a digital video recorder (DVR) and may perform multimedia time warping and location shifting.

As illustrated in FIG. 5, the wireless POD module 200 includes an OOB modem 218 to receive and transmit OOB data from and to the cable provider's systems. The OOB modem 218 may include a QPSK transmitter 220 and receiver 219. The OOB data received via the cable system can be transmitted to the OOB processing block 206 of the Media Processing Module 204. The OOB block 206 also handles the transmission of OOB data to the cable system, via the OOB modem 218.

Stored media can be accessed using the multimedia time warping functionality of the wireless POD module 200. The multimedia time warping functionality uses the integrated digital storage unit (i.e., the hard disk drive) 214 and operating software of the wireless POD module 200 to allow users to view live programming with an option of instantly reviewing previous segments within the program. An accompanying BLUETOOTH remote control 510 which is designed to operate with the wireless POD module 200 can be used to manipulate the content during viewing. Command signals which originate from the remote control 510 are accepted via the BLUETOOTH transceiver 228 of the wireless POD module 200 and are processed by the CPU 205. Commands which are transmitted by the BLUETOOTH remote control 510 to the wireless POD module 200 can affect a flow of the MPEG-2 media stream, and allow the user to reverse, fast forward, play, pause, index, fast/slow reverse play, and fast/slow play live content.

Upon receiving a signal to access stored content, the media switch 209 extracts program material from the hard disk drive 214 and reassembles it into an MPEG-2 media stream, which is then sent to CP encrypter 152 encrypts and transmits the encrypted MPEG-2 media stream to the host 100.

In addition, the present general inventive concept allows the user to store select television programming in the hard disk drive 214 of the wireless POD module 200 while the user is simultaneously watching or reviewing another program. For example, the user can use the interactive program guide (IPG) and recording scheduler of the wireless POD module 200 to direct the wireless POD module 200 to record specific programs on predetermined dates and times. The wireless POD module 200 allows users to remotely access the Interactive Program Guide and recording scheduler. As illustrated in FIG. 5 and as previously discussed, the wireless POD module 200 can connect to a data network via one of its wired or wireline interfaces. In turn, users can utilize an Internet-enabled cell phone, PDA, personal computer, or other device to access the wireless POD module 200 over a data network and set recording options.

As illustrated in FIG. 5, the wireless POD module 200 interfaces with an IEEE 802.11 wireless router 504. The wireless router 504 enables connected devices on the LAN to exchange data with one another and access the Internet 506. Such connectivity allows the wireless POD module 200 to receive/transmit data from/to other network-connected devices over a data network such as a LAN, WAN, or the Internet.

In the present embodiment, the wireless POD module 200 can transmit service orders (e.g., pay per view, programming changes, home shopping, etc.) and requests corresponding to information (billing, etc.) to the cable provider 501 via the Internet 506. The cable provider could fulfill these requests by transmitting information to the wireless POD module 200 via the Internet 506 using the same path the original request traversed, or via the cable network 500.

The wireless POD module 200 can receive content over the Internet 506 from various content or service providers. In the present embodiment, the Interactive Program Guide (IPG) made available by the wireless POD module 200 through the host 100, provides an option corresponding "Internet Content". Selecting this option may further provide the user with an index of Internet content providers and a brief description of their respective programming options. This index may be automatically updated via the Internet 506 at any possible frequency.

The user can select a content provider 507 which offers a video-on-demand service. Upon selecting the content provider 507 from a list of content providers using the remote control 510, the wireless POD module 200 establishes connectivity with a media switch 508 of the content provider 507, which subsequently authenticates the user and provides the user with access to an index of available videos which are stored in a content server 509 of the content provider 507. The user can select a specific movie that he would like to view. Content corresponding to the selected movie is subsequently streamed from the media switch 508 over the Internet 506 to the user's router 504, and wirelessly transmitted from the router 504 to the wireless POD module 200 to be output to the host 100.

Internet content which is received via one of the above mentioned transceivers of the wireless POD module 200 is directed to the Media Processing Module 204. If the received content is encrypted according to the OpenCable specifications or other standards, the content may be sent to the CA decrypter 151 to be descrambled before being directed to the Media Processing Module 204.

Thereafter, the content may need to be converted to another format if it is not compatible with the host 100. For example, if an incoming media stream is in MPEG-4/H.264 AVC and the host 100 can only process MPEG-2, transcoder 207 will convert the media stream to an MPEG-2 media stream. Upon conversion, the Media Switch 209 buffers the media stream into memory, and simultaneously performs two operations if the user is viewing and/or listening to the incoming content which is being received via the Internet 506. More specifically, the buffered media stream is supplied to CP encrypter 152 to be returned to the host 100 and it is also written to the hard disk drive 214 or other storage device. The stored media can be used in conjunction with the multimedia time warping functionality of the wireless POD module 200 to alter a user's viewing and/or listening experience. Features of the remote control 510 may be used as described earlier to manipulate the viewing and/or listening experience of content which is received via the Internet 506.

Movies which are downloaded from a video-on-demand provider and stored in the hard disk drive 214 of the wireless POD module 200 may expire within a certain time period as specified by the provider. The wireless POD module 200 is configured to adhere to such expiration parameters which are embedded in the content and will automatically purge the content from the hard disk drive 214 when the expiration date and time are reached. Movies and other content downloaded from content providers via the Internet 506 may also impose copy restrictions and other digital rights management (DRM) requirements, which can also be enforced by the wireless POD module 200.

As further illustrated in FIG. 5, a personal computer 505 interfaces with the wireless router 504 via an Ethernet cable. The personal computer 505 may be running any operating system such as Microsoft Windows XP, Microsoft Windows Vista, Apple OS X, etc. The computer 505 serves as a central repository to store the user's digital content, including movies, TV shows, photos, and music. A media server application installed and operating on the computer 505 works in conjunction with the wireless POD module 200 and accompanying remote control 510 described herein. The media server application may be downloaded on the computer 505 via the Internet 506, installed from a storage medium such as a CD or diskette, or may come pre-loaded on the computer 505 from the manufacturer.

The wireless POD module 200 can detect and establish connectivity with the media server application operating on a LAN connected personal computer such as the computer 505 or other compatible media device. The media server application indexes user selected media assets which are stored on the personal computer 505, and makes the index available to the wireless POD module 200 to be displayed through the host 100. The media server application is further designed to transmit user requested media content to the wireless POD module 200 to be output via the host 100. The user can navigate the media index using the remote control 510, and can make a specific content selection using appropriate keys.

In another embodiment, the media server application described herein could be integrated into available operating systems (e.g., Microsoft's Windows XP Media Center Edition, Microsoft's Windows Vista, Apple's OS X, etc.) or existing software applications that function as media players (e.g., Apple Computer's Front Row, Apple Computer's iTunes, Apple Computer's QuickTime, Microsoft's Windows Media Player, RealNetwork's RealPlayer, etc.) while remaining within the spirit and scope of the present general inventive concept.

The media server application allows separate user profiles to be created, thereby facilitating personalized access by individual users to their content stored on the computer 505 through the wireless POD module 200.

In addition, the wireless POD module 200 can detect multiple computers on the LAN with the media server application operating thereon. If multiple computers are detected, the wireless POD module 200 may generate a list of computers to choose from to be selected by the user. The list of computers is presented in a graphical user interface output via the display 112 of the host 100. The user can utilize the remote control 510 to make the appropriate selection and initiate connectivity with the user's personal computer 505 which runs the media server application thereon. Upon establishing connectivity with the personal computer 505 as it is running the media server application, a user may be prompted to input a username/password, PIN, or some other personal security key to be granted access to their media library. Such security keys can be configured in the media server application and are authenticated when connectivity is established.

As the network-connected personal computer 505 may reside in another location within the user's home, the user can make use of the BLUETOOTH remote control 510 that accompanies the wireless POD module 200 to select specific media assets stored on the computer to view and/or listen through the host 100.

The media server application can receive and process signals transmitted by the BLUETOOTH remote control 510 through the wireless POD module 200. The BLUETOOTH remote control 510 may be used to initially signal the wireless POD module 200 to establish connectivity with the media server application which operates on the computer 505. According to the present embodiment, a designated button on the remote control 510 is available to initiate connectivity with the personal computer 505 which is running the media server application. When the button is pressed on the remote control 510, a corresponding signal is transmitted from the remote's BLUETOOTH radio to the wireless POD module 200. The signal is received via the BLUETOOTH antenna 234 and the BLUETOOTH transceiver 228 of the wireless POD module 200 and is forwarded to the CPU 205. The CPU 205 processes the signal and initiates application-layer connectivity with the computer 505, which is running the media server application, via the 802.11 transceiver 221. Certain control signals which are transmitted by the BLUETOOTH remote control 510 are received by the wireless POD module 200 in the same way as described above, processed by the CPU 205, and transmitted to the personal computer 505, which is running the media server application, via the 802.11 interface. According to another embodiment, the wireless POD module 200 could also connect to the LAN via the Ethernet interface 236—in which case the processed control signal would be transmitted via the integrated Ethernet transceiver 235.

After the wireless POD module 200 establishes application-layer connectivity with the computer 505 which runs the media server application, a graphical user interface (GUI) is presented to the user on the television display 112. The media server application makes available an index of available content categories (e.g., Movies, TV Shows, Photos, Music, etc.), which are presented to the user via the GUI. The operating system of the wireless POD module 200, the media server application which runs on the computer 505, or a combination thereof, may drive elements of the GUI presented to the user on the television display 112.

The user can utilize designated buttons on the remote control 510 to navigate menu options. Within content categories and related submenus, the user can further select specific media assets stored on the computer 505 to view and/or listen via the host 100.

The remote control 510 can also be used to adjust the viewing/listening experience by using designated keys on the remote control such as "play", "stop", "pause", "rewind", "fast forward", etc. These and other buttons on the remote control 510 can be used to issue various commands to the computer 505 with the media server application operating thereon. The media server application receives and processes the signals according to their intended function. For example, buttons on the remote control 510 can allow a series of digital images to be cycled forward or backward, music to be played, paused, etc.

Content which is requested by the user is transmitted by the media server application which operates on the personal computer 505 to the wireless POD module 200. The content can be received via the 802.11 antenna 227 and the 802.11 transceiver 221 of the wireless POD module 200 and is therein transferred to the Media Processing Module 204. The received content may be transcoded by transcoder 207 into a format compatible with the host 100.

The content is subsequently transferred to the CP encrypter 152 be processed, and is further transmitted to the host 100 via the inband interface, to be output via the display 112 and the speakers 114.

In another embodiment, content which is stored on the personal computer 505 and requested by the user as earlier described may be transcoded by the media server application into a format that is compatible with the host 100 before being transmitted to the wireless POD module 200. The present embodiment assumes that the wireless POD module 200 can capture all media processing capabilities of the host 100 and can further transmit the information corresponding the media processing capabilities of the host 100 to the media server application upon initial connectivity, in order to allow the media server application to subsequently transcode requested content to a format that is compatible with the host 100.

In yet another embodiment, the media server application which operates on the personal computer 505 allows users to activate a synchronization feature that works in conjunction with the wireless POD module 200. The synchronization feature, when activated, allows the media server application to automatically copy data which is stored on the personal computer, such as movies, TV shows, music, photos, and other content across a user's home network and onto the hard disk drive 214 of the wireless POD module 200. This allows users to directly access the content from the wireless POD module 200, thereby providing an enhanced viewing and/or listening experience since the accessed content is not being streamed over a data network.

The wireless POD module 200 also comes with its own synchronization feature, whereby content stored in its hard disk drive 214 can be automatically copied across a network and onto the hard disk drive of a personal computer 505 or other network-connected device running the media server application specified herein.

The synchronization feature contained in the media server application and the wireless POD module 200 both allow users to set their own preferences as to what types of content is automatically copied to target devices (e.g., unwatched TV shows, new purchases, etc.).

In the present embodiment, the remote control 510 includes a BLUETOOTH radio and an infrared emitter. The remote control 510 can be programmed to function as a "universal remote", which allows the user to control other electronic devices with infrared or BLUETOOTH receivers. For example, the remote control 510 may be programmed to control the host 100 itself. The accompanying remote control (or keyboard device) 510 may use other wireless communication options to communicate with the wireless POD module 200 while remaining within the spirit and scope of the present general inventive concept.

In the present embodiment of the present general inventive concept, the remote control 510 integrates Radio Frequency Identification (RFID) technology. More specifically, the remote control 510 may include an RFID Module that can function as both an RFID tag and an RFID reader. The RFID Module can read an RFID tag and can write data to a particular RFID tag.

According to the present embodiment, the RFID Module allows interoperability with all RF 13.56 MHz readers and tags which are compatible with existing international standards, including ISO 14443 A/B, ISO 15693, Sony FeliCa™, and Near Field Communication (NFC). NFC technology can be used as a virtual connector system to quickly and securely establish wireless connectivity between the wireless POD module 200 and other electronic devices. Near Field Communication (NFC) technology—which was jointly developed and promoted by Philips and Sony—evolved from a combination of contact-less identification and interconnection technologies. Underlying layers of NFC technology are standardized in ISO (18092 and 21481), ECMA (340 and 352), and ETSI TS 102 190. Other RFID standards could be supported by the RFID Module while remaining within the scope and spirit of the present general inventive concept.

The RFID Module is provided to allow the remote control 510 to rapidly exchange information with an electronic device that is in close proximity to the remote control 510, and which also has integrated RFID technology. Information which is exchanged between the remote control 510 and an initiating device via RFID can allow for the fast, automatic, and secure set-up of Wi-Fi, BLUETOOTH®, and other wireless connections between the wireless POD module 200 and the initiating electronic device in accordance with the NFC specifications. These specifications allow RFID technology to be employed as a virtual connector system. According to the present embodiment, data received by the remote control 510 from the initiating device via RFID is automatically transmitted to the wireless POD module 200 via one of its wireless interfaces in order to facilitate an automatic setup of a wireless connection between the wireless POD module 200 and the initiating device using a common wireless standard.

In accordance with the present general inventive concept, the wireless POD module 200 also integrates teachings and methods outlined in U.S. patent application Ser. No. 11/127,979 filed by the applicant of this general inventive concept and incorporated herein in its entirety by reference. The teachings and methods in the referenced Patent Application specify techniques to capture a media processing capability and other parameters of a target device via RFID, using RFID to quickly establish a wireless connection with a target device and automatically transmitting certain media assets to it once connectivity has been established, and establishment and use of profiles corresponding to target devices that have previously exchanged communication settings and parameters via RFID. Such functionality could be used to allow a media player (e.g., cellular phone, video player, etc.) with an integrated RFID module to quickly establish a communication link with the wireless POD module 200 and automatically transmit certain media assets to it once connectivity has been established. The method includes, in the present embodiment, automatically transmitting media that is being viewed/played on the media player at the time of an RFID exchange with its remote control 510 or an accompanying keyboard. Media content to be transmitted to the wireless POD module 200 would be automatically processed and output to the host 100 (e.g., TV) as described herein. The user can in turn use the controls (e.g., "play", "pause", "fast forward", "rewind", "stop", "skip back", "skip forward", etc.) on the transmitting media player device, or software operating therein, to alter the viewing and/or listening experience of the media being output via the host 100.

In accordance with U.S. patent application Ser. No. 11/127,979 filed by the applicant, a registration of electronic devices via RFID and establishment of profiles to connect devices within the wireless POD module 200 can be used to securely register wireless VOIP handsets. An initial exchange of encryption data and other parameters via RFID allows the VOIP handsets to securely communicate with the wireless POD module 200 on an ongoing basis.

The RFID Module in the remote control 510 can also be used to facilitate electronic payments via a data network such as the Internet by capturing account data from credit cards (e.g., MasterCard Paypass™, American Express Express-Pay™, etc.), fobs, cellular phones, and other payment devices that have integrated RFID chips. The RFID Module can also be used to facilitate user authentication over a data network such as the Internet 506 by capturing identification data from identification devices with integrated RFID chips (e.g., loyalty cards, membership cards, ID cards, cellular phones, etc.) and transmitting the identification data to a server. The RFID module may be used to authenticate users within the wireless POD module 200 itself, allowing users to securely access their profile within the identification device. The wireless POD module 200 may come with RFID tokens that can be assigned to individual users, or can allow other RFID-based devices to be registered and linked to user profiles within a system using the remote control 510.

In another embodiment, a wireless media player 511 (e.g., a cellular phone, Apple iPod®-type device, Microsoft Zune®, etc.), can establish BLUETOOTH connectivity with the wireless POD module 200 and can stream stored content (e.g., video, photos, music, etc.) to the wireless POD module 200 to be output via the host 100. In the present embodiment, the user has the option of using controls on the media player 511 to adjust the viewing and/or listening experience of content being output through the host 100. For example, the user can use the media player's 511 hardware controls or "softkeys" to pause, play, rewind, or fast forward video being displayed via the host 100. While the example herein illustrates the wireless media player 511 connected to the wireless POD module 200 via BLUETOOTH®, any common wireless standard could be used to establish direct communication while remaining within the spirit and scope of the present general inventive concept.

Figure 6:
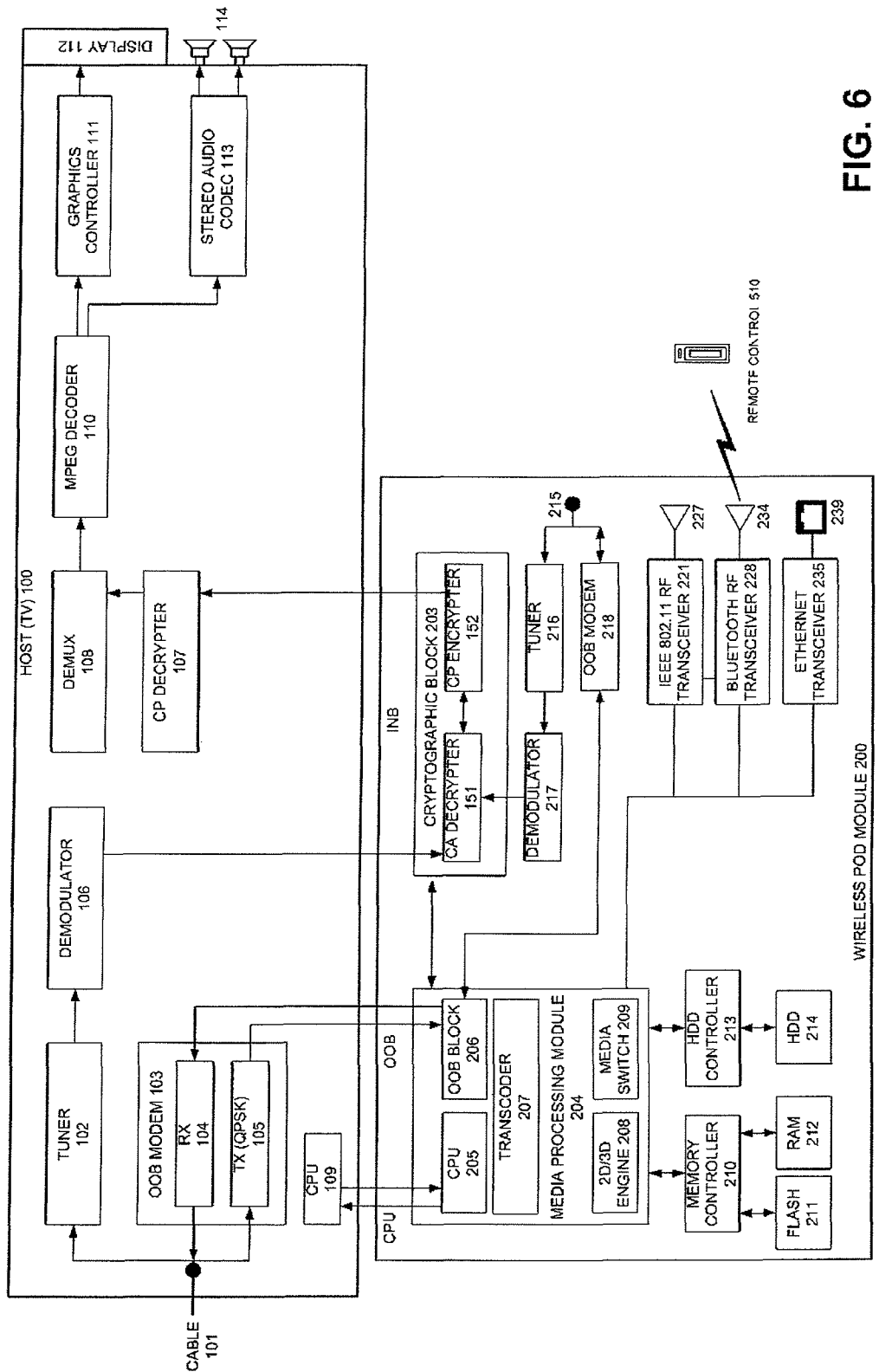
FIG. 6 is a block diagram of a wireless POD module 200 to communicate with a host device 100 and a wireless remote control 510 according to an embodiment of the present general inventive concept.

FIG. 6 is a block diagram of a wireless POD module 200 communicating with a host device 100 and a wireless remote control 510, in accordance with an embodiment of the present general inventive concept. Referring to FIGS. 2 and 6, the wireless POD module 200 herein is inserted into the CA slot of the host 100 to allow the wireless POD module 200 to communicate with the host 100. Unlike the wireless POD module 200 depicted in FIG. 5, the wireless POD module 200 illustrated in FIG. 6 receives content directly from the host 100.

Media which is received by the wireless POD module 200 from the host 100 via the inband port is processed in a similar manner as content received via one of the wireless or wired interfaces of the POD module 200, as described above. According to the present embodiment, the host 100 receives content via its communications link (e.g., cable network cable 101). For example, MPEG-4/H.264 AVC format video data may be received at the tuner 102 from the cable 101 and demodulated at the demodulator 106. The demodulated MPEG-4/H.264 AVC data is provided to the CA decrypter 151 of the wireless POD module 200 via the inband port as previously described. The decrypted MPEG-4/H.264 AVC data is further supplied to the transcoder 207 if required. For example, if the host 100 cannot process the MPEG-4/H.264 AVC data, then the content may be transcoded by the transcoder 207 to a format that is compatible with the host 100. In this manner, the wireless POD module 200 produces output that is compatible with the MPEG decoder 110 which present in the host 100 without necessitating modification of the host device 100. The output from the transcoder 207 can be in the form of MPEG-2 data, which is directed to the Media Switch 209. The Media Switch 209 buffers the media stream into memory, and simultaneously performs two operations if the user is viewing and/or listening to the incoming content being received from the host 100. More specifically, the buffered stream is supplied to CP encrypter 152 to be returned to the host 100, and the buffered stream is also written to the hard disk drive 214 or other storage unit. The stored media can be used in conjunction with the multimedia time warping functionality of the wireless POD module 200 to alter the viewing and/or listening experience of the user. The accompanying BLUETOOTH remote control 510 can be used as previously described to instantly review previous segments within the program that is being watched live. As also mentioned before, the present general inventive concept allows a user to store selected television programming in the wireless POD module 200 while the user is simultaneously watching or reviewing another program.

Figure 7:
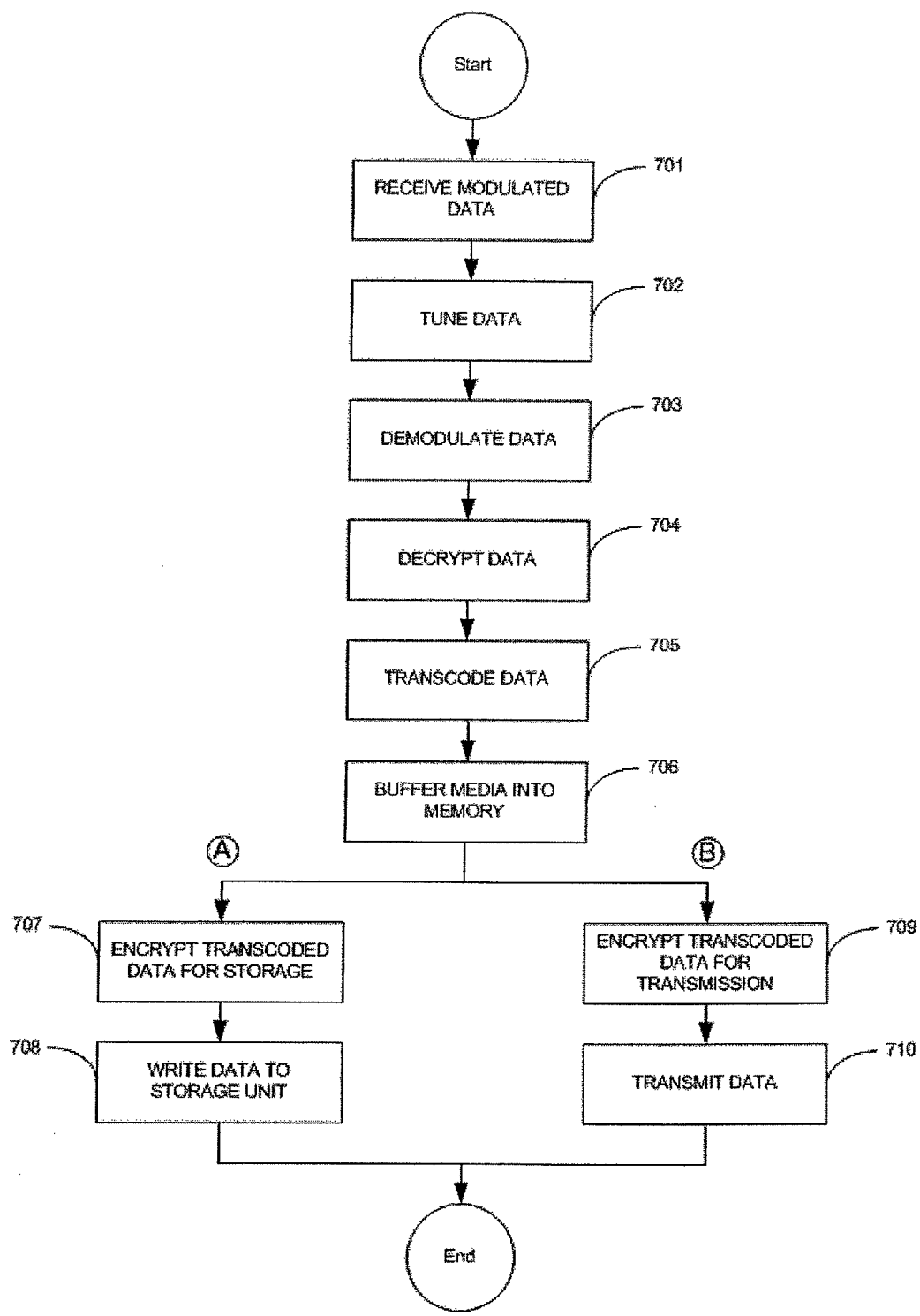
FIG. 7 is a flow diagram illustrating a method of receiving, processing, storing, and transmitting data in a wireless POD module according to an embodiment of the present general inventive concept.

FIG. 7 is a flow diagram illustrating operations in a process of a wireless POD module 200 receiving, processing, storing, and transmitting data, in accordance with an embodiment of the present general inventive concept. The flow diagram in FIG. 7 refers to FIG. 5, whereby the wireless POD module 200 the cable television network cable 101 which is directly connected to the integrated coaxial connector 215. Accordingly, the cable television network cable 101 is used as a transmission medium to send content to and data to and from the wireless POD module 200. In operation 701, content is supplied to the wireless POD module 200 as a stream of modulated data (e.g., a modulated multiplexed MPEG-2 data stream) to the tuner 216. In operation 702, the tuner 216 selects a particular channel of incoming content (e.g., based on user selection through the Interactive Program Guide). The tuned content is supplied to demodulator 217 and demodulated in operation 703. The demodulated data is supplied to a Conditional Access (CA) decrypter 151 and is decrypted in operation 704. In operation 705, the decrypted data is provided to the transcoder 207 and the data is transcoded to a format (e.g., MPEG-4/H.264 AVC to MPEG-2) that can be processed by the host 100. Operation 705 can be omitted if the data is already in a format which the host 100 can process.

After media streams are transcoded in operation 705, the MPEG stream is sent to the Media Switch 209. In operation 706, the Media Switch 209 buffers the MPEG stream into memory (e.g., the hard disk drive 214). The Media Switch 209 then performs two operations simultaneously if the user is viewing real-time programming through the host (television). These simultaneous operations are represented in FIG. 7 under Branch "A" and Branch "B" of the flow diagram. Under Branch "A", in operation 707, data is encrypted by the media switch 209 before it is written to the hard disk drive 214. A purpose of encrypting programming content before it is stored is to ensure that the content cannot be accessed and copied by computer-pirates or computer-hackers, that attempt to take apart the wireless POD module 200 in order to access media stored in the integrated storage unit. The data may be encrypted using any number of cryptographic algorithms such as DES, 3DES, AES, RC4, SHA-1, RSA, DSA, etc. Each wireless POD module 200 may be able to generate its own encryption/decryption keys which may be stored in a tamper-proof storage component of the device. After the data has been encrypted, the Media Switch 209 parses the resulting MPEG stream and separates it into video and audio components. It then stores the components into temporary buffers. Events are recorded that indicate the type of component that has been found, where it is located, and when it occurred. The program logic is notified that an event has occurred and the data is extracted from the buffers. The video and audio components are written to the hard disk drive 214 or other storage component in operation 708. As mentioned earlier, stored media can be accessed using the remote control 510 and multimedia time warping functionality of the wireless POD module 200.

The operations under Branch "B" are performed concurrently with the operations Under Branch "A". In operation 709, the stream of data is also supplied to CP encrypter 152 to be encrypted. Once the data is encrypted, the data is transmitted to the host 100 in operation 710. The wireless POD module 200 can transmit processed content to devices other than the host 100. For example, the wireless POD module 200 may transmit programming content to a network-connected device on a LAN, WAN, or the Internet 506 via its wireless or wired interface. Accordingly, the transmitted content would be encrypted in operation 709 using encryption keys that were previously exchanged with the target device to a location where the content is being transmitted.

In the process illustrated in FIG. 7, the media which is written to the hard disk 214 is in the same format as the media that is transmitted to the host 100. In another embodiment, the input media stream could be transcoded to one format to be stored, and another format to be transmitted to the host 100. In accordance with this embodiment, when the stored media is retrieved from the hard disk to be output to the host 100, the media could be transcoded to a format that is compatible with the host 100 prior to transmission. This process is further detailed in FIG. 8.

FIG. 7 details how broadcast television content is received and processed via a coaxial interface to the cable provider. As the wireless POD module 200 can connect to an Internet Protocol (IP) network via its IEEE 802.11 or Ethernet interface, it is important to consider the process by which the wireless POD module 200 could receive Internet Protocol television (IPTV) content. With IPTV, operations 701-703 are not applicable.

With IPTV, a subscriber may perceive that he is "tuning" to a particular channel number, but what happens when he selects a channel is much different with IPTV than with broadcast TV. When a user "tunes" an IPTV program, he does one of two things depending on whether the channel he is tuning is multicast (the IP equivalent of broadcast, sent to all subscribers simultaneously), or unicast (sent only to the one subscriber). If the signal is multicast, the wireless POD module 200 requests a copy of the multicast stream, which must be found in the network and supplied to this wireless POD module 200. If the signal unicast, the stream is requested from the headend 501.

After the signal arrives at the wireless POD module 200, the IP transport protocols are stripped, leaving the encrypted MPEG transport stream. The process continues with operation 704, where the content is supplied to CP decrypter 151 to be decrypted. The remaining operations which are illustrated in FIG. 7 remain in the same.

Many variations of the process illustrated in FIG. 7 will be apparent to those of ordinary skill in the art upon consideration of the present general inventive concept.

Figure 8:
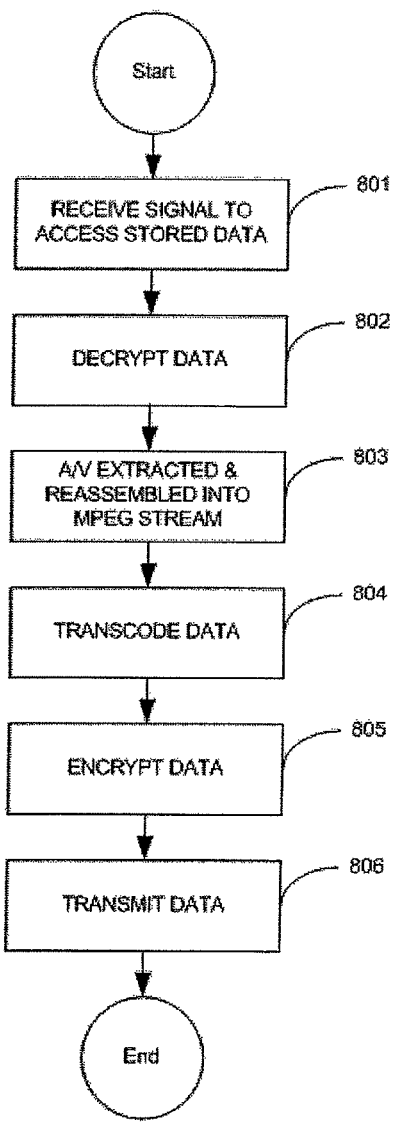
FIG. 8 is a flow diagram illustrating a method of receiving a signal to access stored data and transmitting the requested data to another device in a wireless POD module according to an embodiment of the present general inventive concept.

FIG. 8 is a flow diagram illustrating operations in a process of a wireless POD module 200 receiving a control signal to access stored data, and transmitting the requested data to another device in accordance with an embodiment of the present general inventive concept.

FIG. 5 may also be referenced to explain the flow diagram in FIG. 8. The BLUETOOTH remote control 510 is used to access and manipulate the output of content stored in the storage unit (i.e., the hard disk drive) 214 of the wireless POD module 200. For example, if the user desires to watch a previous segment of a live television program which is stored on the hard disk drive 214, the user may operate the remote control 510 to instantly access the stored segment. The user may instantly access the stored segment by pressing appropriate button(s) on the remote control 510. Accordingly, the remote control 510 can transmit specific command signals via its BLUETOOTH interface. These commands may affect a flow of an MPEG stream and allow the user to view stored content with a plurality of functions, including reverse, fast forward, play, pause, index, fast/slow reverse play, and fast/slow play.

In operation 801, an appropriate signal to initiate access to stored content is received by the BLUETOOTH antenna 234 and the transceiver 228 of the wireless POD module 200. The signal is processed by the CPU 205, which notifies the Media Switch 209 to extract stored data from the hard disk drive 214.

In operation 802, the extracted video and audio components are decrypted. As illustrated in FIG. 7 the data is encrypted prior to being written to the hard disk drive 214.

In operation 803, decrypted video and audio components are reassembled by the Media Switch 209 into an MPEG stream. The MPEG stream is then sent to the transcoder 207, and the data is transcoded into a format that can be processed by the host 100 in operation 804. The transcoding operation is only necessary if the stored content is in a format that is not compatible with the host 100.

In operation 805, the transcoded data is sent to the CP encrypter 152 to be encrypted. After the data is copy protected, the data is transmitted to the host 100 via the inband interface in operation 806.

In the present embodiment, access to the stored content is initiated by the BLUETOOTH remote control 510, and the stored content is subsequently transmitted to the host 100 to be output. The process outlined in FIG. 8 could also apply in situations where a network-connected media player device connects to the wireless POD module 200 and issues a signal to access stored content, and then the stored content is subsequently transmitted from the wireless POD module 200 to the initiating device over a data network.

Many variations of this process will be apparent to those of ordinary skill in the art upon consideration of the present general inventive concept.

Figure 9:
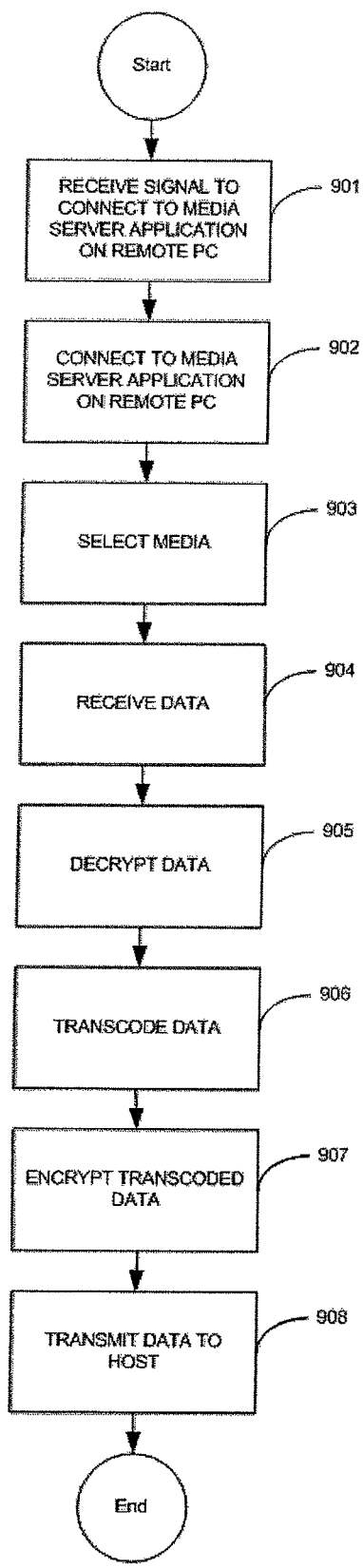
FIG. 9 is a flow diagram illustrating a method of receiving data from a personal computer running a media server application, processing the data, and transmitting the processed data to the personal computer in a wireless POD module according to an embodiment of the present general inventive concept.

FIG. 9 is a flow diagram illustrating operations in a process of a wireless POD module 200 receiving data from a personal computer running a media server application, processing said data, and transmitting the processed data to the host, in accordance with an embodiment of the present invention.

FIG. 5 may also be referenced to explain the flow diagram in FIG. 9. In accordance with an embodiment of the present general inventive concept, a button can be pressed on the BLUETOOTH remote control 510 to initiate connectivity between the wireless POD module 200 and the LAN-connected personal computer 505 while it is running the media server application. Upon pressing the designated button on the remote control 510, a signal is transmitted from the remote control 510 via its BLUETOOTH radio. In operation 901, the signal is received by the BLUETOOTH transceiver 228 and is processed by the CPU 205. In operation 902, the CPU 205 initiates connectivity between the wireless POD module 200 and the media server application operating on the personal computer 505. Connectivity may be established using any known application layer protocol.

Upon establishing connectivity with the media server application on the PC 505, the user can be presented with a list of media categories and sub-categories (e.g., movies, photos, music, etc.) from which to choose. The user can utilize the accompanying remote control 510 to navigate the user interface menu options, and further select specific media items stored on the personal computer to view and/or listen via the host 100 (e.g., television). The user may navigate through the various categories and sub-categories, and in operation 903 the user may make a selection once the desired media category (item) is found.

Upon selecting the desired media item(s) to be accessed, the media server application operating on the personal computer 505 begins streaming the selected media assets to the wireless POD module 200. In operation 904, the wireless POD module 200 begins receiving the media assets via the 802.11 interface 222 of FIG. 2.

In accordance with the present embodiment, certain media assets which are transmitted by the media server application may be encrypted. For example, the media asset may be a movie downloaded from the user's cable provider. The movie may be encrypted to only allow the movie to be played on the computer 505 running a version of the media server application that is registered with the cable provider, or through a television where the movie is first decrypted by a registered wireless POD module 200. Operation 905 may be required to decrypt such media content when it is received. The content may be decrypted by the CA decrypter 151.

When the received content cannot be processed by the host 100 because the content is in an incompatible format, the data is transcoded in operation 906 by transcoder 207. Once the data is transcoded, the data is passed to CP encrypter 152 where it is copy protected in operation 907. Finally, in operation 908 the data is transmitted by the wireless POD module 200 to the host 100 via the inband port. The data can then be output via the television's (e.g., the host 100) display 112 and speakers 114.

The remote control 510 can be used to manipulate the incoming media stream from the media server application on the personal computer 505. For example, designated buttons on the remote control 510 can be used to stop, play, rewind, fast-forward, and perform other operations. Such control signals are transmitted from the remote control 510 to the wireless POD module 200, processed by the wireless POD module, and transmitted via the data network to the media server application on the personal computer 505.

A similar process to the process illustrated in FIG. 9 also applies to an instance when content is received from a network-connected media player device such as a cellular phone, PDA, video player, etc. Accordingly, connectivity is established between the media player and the wireless POD module 200. Upon establishing connectivity, the user can use the controls of the media player to transmit select content to the wireless POD module 200 to output the content via the host 100. The content is received by the wireless POD module in operation 904 and similarly processed from there. The user can utilize the hardware or software controls of the media player device to adjust the media stream being output through the host 100.

The foregoing disclosure of the preferred embodiments of the present general inventive concept has been presented for purposes of illustration and description. It is not intended to be exhaustive or to limit the general inventive concept to the precise forms disclosed. Many variations and modifications of the embodiments described herein will be apparent to one of ordinary skill in the art in light of the above disclosure. The scope of the invention is to be defined only by the claims, and by their equivalents. Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An extended connectivity apparatus to provide multimedia data from a multimedia source device to a multimedia presentation device, the apparatus comprising:
   an electrical connector to provide a communication path to the multimedia presentation device when mechanically coupled to a corresponding connection point on the multimedia presentation device;
   a wireless communication interface through which to receive multimedia data over a wireless communication channel, wherein the wireless communication interface can be connected to, and disconnected from, the multimedia presentation device via the electrical connector;

a decrypter to decrypt the received multimedia data;

an encrypter to encrypt the multimedia data for transmission to the multimedia presentation device; and a processor to control the decrypter and the encrypter, to encode the received multimedia data for presentation at the multimedia presentation device, and to transmit the encrypted and encoded multimedia data to the multimedia presentation device, wherein the processor can be connected to and disconnected from the multimedia presentation device at the electrical connector, and wherein the encrypted and encoded multimedia data is transmitted to the multimedia presentation device through the electrical connector.

2. The apparatus of claim 1, wherein the processor includes a transcoder to encode the multimedia data from a format incompatible with the presentation capabilities of the multimedia presentation device into a format compatible with the presentation capabilities of the multimedia presentation device.

3. The apparatus of claim 1, wherein the wireless communication interface constructs the wireless communication channel as a point-to-point wireless communication link with the multimedia source device separated from the multimedia presentation device.

4. The apparatus of claim 1, wherein the wireless communication interface constructs the wireless communication channel as a wireless communication link among a plurality of communication links between the multimedia source device and the multimedia presentation device in a communications network.

5. The apparatus of claim 1, wherein the wireless communication interface is configured to receive the multimedia data in an application layer network session with the multimedia source device.

6. The apparatus of claim 5, wherein the multimedia data received by the wireless communication interface is streaming media.

7. The apparatus of claim 6, wherein the processor controls playback of the streaming media in accordance with a playback command received through the wireless communication interface.

8. The apparatus of claim 7, wherein the wireless communication interface comprises a radio-frequency circuit through which the playback command is received.

9. The apparatus of claim 7, wherein the wireless communication interface comprises an infrared circuit through which the playback command is received.

10. The apparatus of claim 1, wherein the processor locates the multimedia source device via a compatible-device discovery process executed thereon.

11. The apparatus of claim 1, further comprising:

a housing having enclosed therein the wireless communication interface and the processor.

12. The apparatus of claim 11, wherein the connector is formed in and extends from the housing.

13. The apparatus of claim 12, wherein the connector is a Personal Computer Memory Card International Association (PCMCIA) connector.

14. The apparatus of claim 12, wherein the connector is a High Definition Multimedia Interface (HDMI) connector.

15. A multimedia presentation system comprising:

a multimedia source device to provide multimedia data;

a multimedia presentation device to present multimedia data received through an electrical connector disposed on the multimedia presentation device; and an extended connectivity apparatus comprising:

an electrical connector to directly or indirectly couple with the electrical connector on the multimedia presentation device forming thereby a communication path over which the multimedia data are conveyed;

a wireless communication interface through which to receive the multimedia data over a wireless communication channel from the multimedia source device, wherein the wireless communication interface can be connected to, and disconnected from, the multimedia device at the electrical connector;

a decrypter to decrypt the received multimedia data;

an encrypter to encrypt the multimedia data for transmission to the multimedia presentation device; and a processor to control the decrypter and encrypter, to encode the received multimedia data for presentation at the multimedia presentation device, and to transmit the encrypted and encoded multimedia data to the multimedia presentation device, wherein the processor can be connected to, and disconnected from, the multimedia presentation device at the electrical connector, and wherein the encrypted and encoded multimedia data is transmitted to the multimedia device through the electrical connector.

16. The system of claim 15, wherein the processor includes a transcoder to encode the multimedia data from a format incompatible with the presentation capabilities of the multimedia presentation device into a format compatible with the presentation capabilities of the multimedia presentation device.

17. The system of claim 15, wherein the connectors on the multimedia presentation device and the extended connectivity apparatus are Personal Computer Memory Card International Association (PCMCIA) connectors.

18. The system of claim 15, wherein the connectors on the multimedia presentation device and the extended connectivity apparatus are High Definition Multimedia Interface (HDMI) connectors.

19. The system of claim 15, wherein the wireless communication interface constructs the wireless communication channel as a point-to-point wireless communication link with the multimedia source device separated from the multimedia presentation device.

20. The system of claim 15, wherein the wireless communication interface constructs the wireless communication channel as a wireless communication link among a plurality of communication links between the multimedia source device and the multimedia presentation device in a communication network.

21. The system of claim 15, wherein the multimedia data are conveyed in an application layer network session established between the multimedia source device and the extended connectivity apparatus.

22. The system of claim 21, wherein the multimedia source device is implemented as processor instructions executing on a mobile computing device having memory in which the multimedia data are stored.

23. The system of claim 22, wherein the mobile computing device includes a cellular network transceiver separate from the wireless communication interface.

24. The system of claim 15, wherein the multimedia data are transmitted from the multimedia source device as streaming media.

25. The system of claim 24, wherein the processor of the extended connectivity apparatus controls playback of the streaming media in accordance with a playback command received through the wireless communication interface.

26. The system of claim 25, wherein the wireless communication interface comprises a radio-frequency circuit through which the playback command is received.

27. The system of claim 26, wherein the radio-frequency circuit is a BLUETOOTH circuit.

28. The system of claim 26, wherein the radio-frequency circuit is a WI-FI circuit.

29. The system of claim 25, wherein the processor of the extended connectivity apparatus selects the streaming media from among a collection of multimedia data stored on the multimedia source device in accordance with a multimedia selection command received through the wireless communication interface.

30. The system of claim 29, wherein the processor of the extended connectivity apparatus renders a multimedia selection interface on the multimedia presentation device on which the collection of multimedia data is displayed.

31. The system of claim 25 further comprising:
a remote control having disposed thereon controls that issue the playback command in response to activation thereof.

32. The system of claim 31, wherein the controls comprise play, pause, rewind and fast-forward controls for issuing play, pause, rewind and fast-forward playback commands, respectively.

33. The system of claim 31, wherein the remote control selects the streaming media from among a collection of multimedia data stored on the multimedia source device by issuing a multimedia selection command to the extended connectivity apparatus.

34. The system of claim 33, wherein the processor of the extended connectivity apparatus renders a multimedia selection interface on the multimedia presentation device on which the collection of multimedia data is displayed.

35. The system of claim 31, wherein the remote control is implemented as processor instructions executing on a mobile computing device.

36. The system of claim 35, wherein the controls of the remote control are elements of a graphical user interface disposed on a display of the mobile computing device.

37. The system of claim 35, wherein the mobile computing device includes a cellular network transceiver separate from the wireless communication interface.

38. The system of claim 35, wherein the mobile computing device includes a memory in which the multimedia data of the streaming media are stored and the multimedia source device is implemented as other processor instructions executing on the mobile computing device.

39. The system of claim 25, wherein the wireless communication interface comprises an infrared circuit through which the playback command is received.

40. The system of claim 15, wherein the multimedia presentation device is a television.

41. A method of extending connectivity in a multimedia presentation device, the method comprising:
establishing a communication path through a selectively separable electrical connector over which multimedia data are conveyed to a multimedia presentation device;
establishing a wireless communication channel over which to receive multimedia data from a multimedia source device;
decrypting the received multimedia data with a decrypter controlled by a processor which can be connected to and disconnected from the multimedia presentation device at the electrical connector;
encoding, by the processor, the multimedia data received over the wireless communication channel for presentation at the multimedia presentation device;
encrypting the multimedia data at an encrypter controlled by the processor for transmission to the multimedia presentation device; and
transmitting the encoded and encrypted multimedia data to the multimedia presentation device via the communication path established through the connector.

42. The method of claim 41, wherein the encoding comprises:
transcoding, by the processor, the multimedia data from a format incompatible with the presentation capabilities of the multimedia presentation device into a format compatible with the presentation capabilities of the multimedia presentation device.

43. The method of claim 41, wherein establishing the wireless communication channel comprises:
establishing the wireless communication channel as a point-to-point wireless communication link with the multimedia source device separated from the multimedia presentation device.

44. The method of claim 41, establishing the wireless communication channel comprises:
establishing the wireless communication channel as a wireless communication link among a plurality communication links between the multimedia source device and the multimedia presentation device in a communication network.

45. The method of claim 41, further comprising:
conveying the multimedia data from the multimedia source device in an application layer network session.

46. The method of claim 45, further comprising:
executing processor instructions on a mobile computing device having memory in which the multimedia data are stored, the processor instructions implementing the multimedia source device on the mobile computing device.

47. The method of claim 41, further comprising:
transmitting the multimedia data from the multimedia source device as streaming media.

48. The method of claim 47, further comprising:
receiving, by the processor, a playback command; and
controlling, by the processor, playback of the streaming media in accordance with the playback command.

49. The method of claim 48, further comprising:
issuing a multimedia selection command from the processor to select the streaming media from among a collection of multimedia data stored on the multimedia source device; and
transmitting the selected streaming media from the multimedia source device.

50. The method of claim 49, further comprising:
rendering, by the processor, a multimedia selection interface to be presented on the multimedia presentation device on which the selected streaming media is displayed.

51. The method of claim 48 further comprising:
issuing the playback command from a remote control by activating one or more controls disposed thereon.

52. The method of claim 51, wherein issuing the playback command comprises:
issuing play, pause, rewind and fast-forward playback commands by activating play, pause, rewind and fast-forward controls, respectively, disposed on the remote control.

53. The method of claim 51, further comprising:
   executing processor instructions on a mobile computing device having memory in which multimedia data of the streaming media are stored, the processor instructions implementing the remote control on the mobile computing device.

54. The method of claim 53, wherein executing the processor instructions comprises:
   executing other processor instructions that implement the controls of the remote control as elements of a graphical user interface disposed on a display of the mobile computing device.

* * * * *